(12) United States Patent
Koto et al.

(10) Patent No.: US 7,496,800 B2
(45) Date of Patent: Feb. 24, 2009

(54) MALFUNCTION MONITORING METHOD AND SYSTEM

(75) Inventors: Kazuhiro Koto, Kariya (JP); Hirokazu Komori, Okazaki (JP); Tadaharu Nishimura, Oobu (JP)

(73) Assignee: Denso Corporation (JP)

( * ) Notice: Subject to any disclaimer, the term of this patent is extended or adjusted under 35 U.S.C. 154(b) by 452 days.

(21) Appl. No.: 11/447,294

(22) Filed: Jun. 6, 2006

(65) Prior Publication Data

US 2006/0277448 A1 Dec. 7, 2006

(30) Foreign Application Priority Data

Jun. 6, 2005 (JP) ............... 2005-165805

(51) Int. Cl.
*G06F 11/00* (2006.01)
(52) U.S. Cl. ....................................... 714/51
(58) Field of Classification Search ............. 714/15–17, 714/20, 21, 23, 39, 47, 51
See application file for complete search history.

(56) References Cited

U.S. PATENT DOCUMENTS

| | | | |
|---|---|---|---|
| 5,966,305 A * | 10/1999 | Watari et al. .............. 700/82 |
| 6,356,821 B1 * | 3/2002 | Yoshida ..................... 701/31 |
| 6,567,930 B1 * | 5/2003 | Moriya ....................... 714/23 |
| 6,732,044 B2 * | 5/2004 | Hashimoto et al. .......... 701/114 |
| 6,883,123 B2 * | 4/2005 | Hashimoto et al. ............ 714/55 |
| 7,251,551 B2 * | 7/2007 | Mitsueda et al. ............. 701/29 |
| 7,287,183 B2 * | 10/2007 | Hashimoto et al. ........... 714/10 |
| 2005/0022060 A1 * | 1/2005 | Hashimoto et al. ........... 714/37 |

FOREIGN PATENT DOCUMENTS

| JP | H07-114490 | 5/1995 |
| JP | H08-006822 | 1/1996 |
| JP | H08-305664 | 11/1996 |
| JP | 2002-091802 | 3/2002 |

* cited by examiner

*Primary Examiner*—Nadeem Iqbal
(74) *Attorney, Agent, or Firm*—Nixon & Vanderhye PC

(57) ABSTRACT

In a method, an interrupt is generated to the processing unit every predetermined period. The predetermined period is shorter than a predetermined timeout period. A watchdog signal is changed in response to each of the generated interrupts. The interrupt generation is disabled, upon the last interrupt being generated over an estimated time when the execution of the program is estimated to be completed.

20 Claims, 19 Drawing Sheets

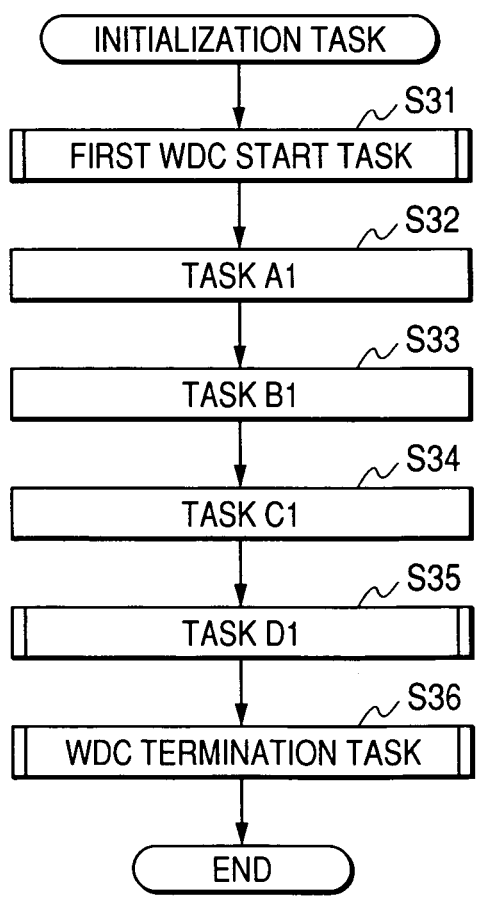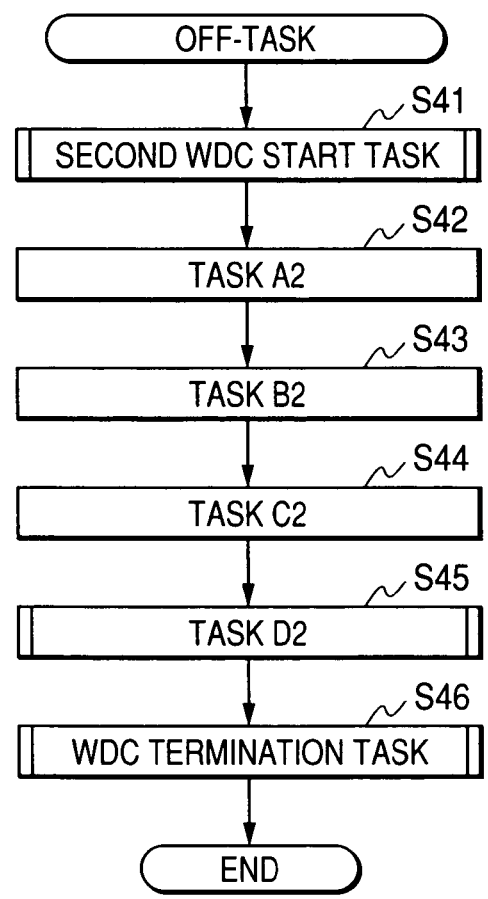

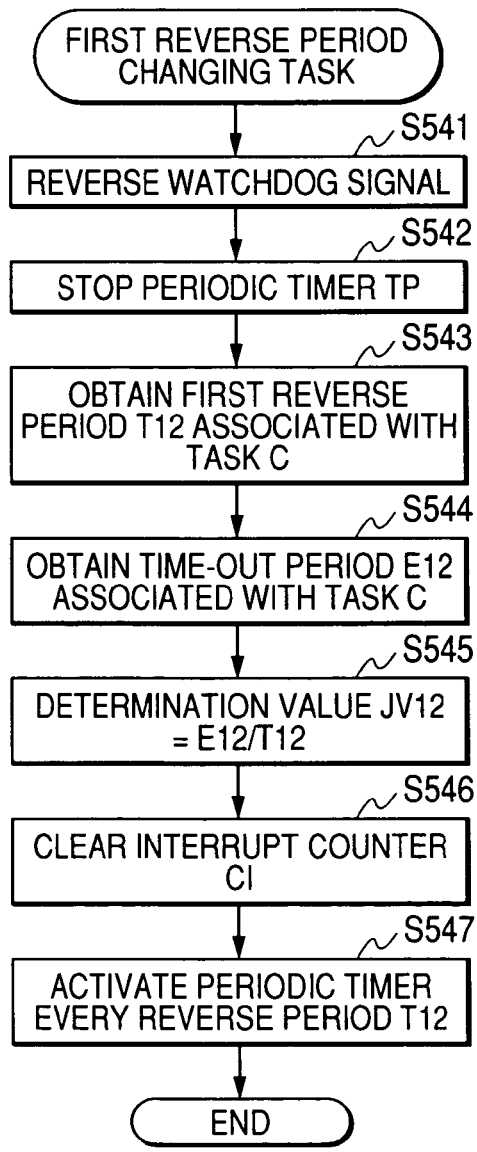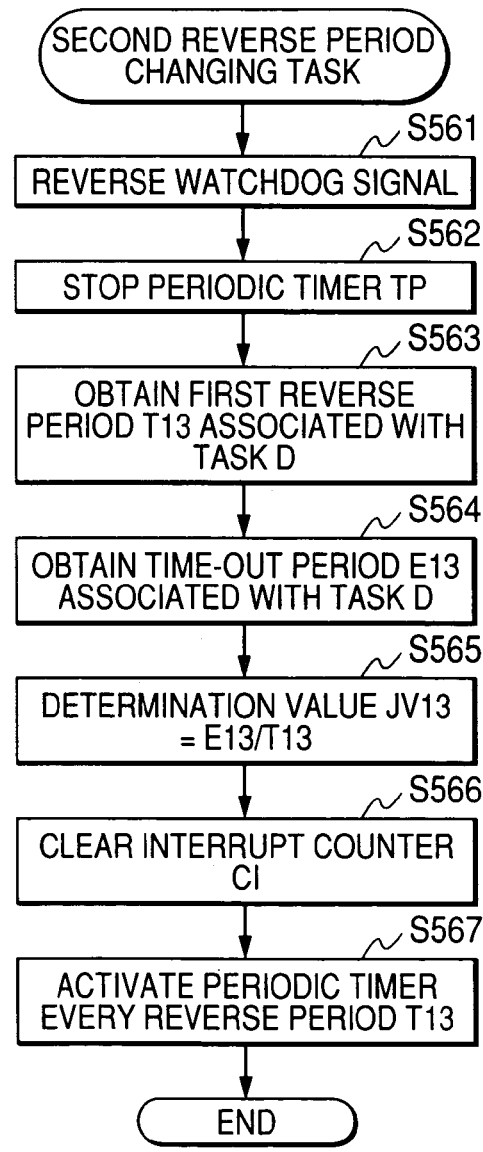

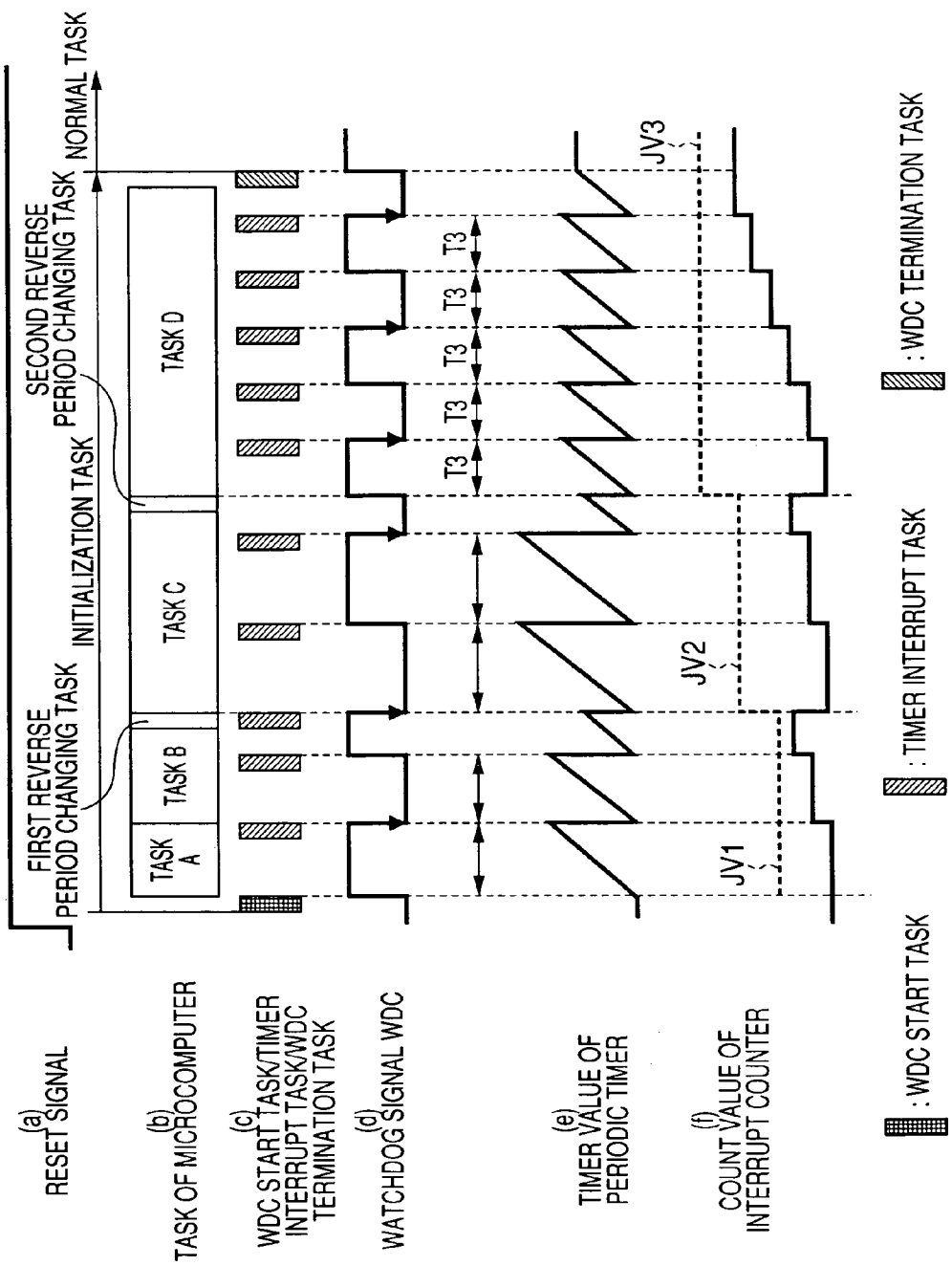

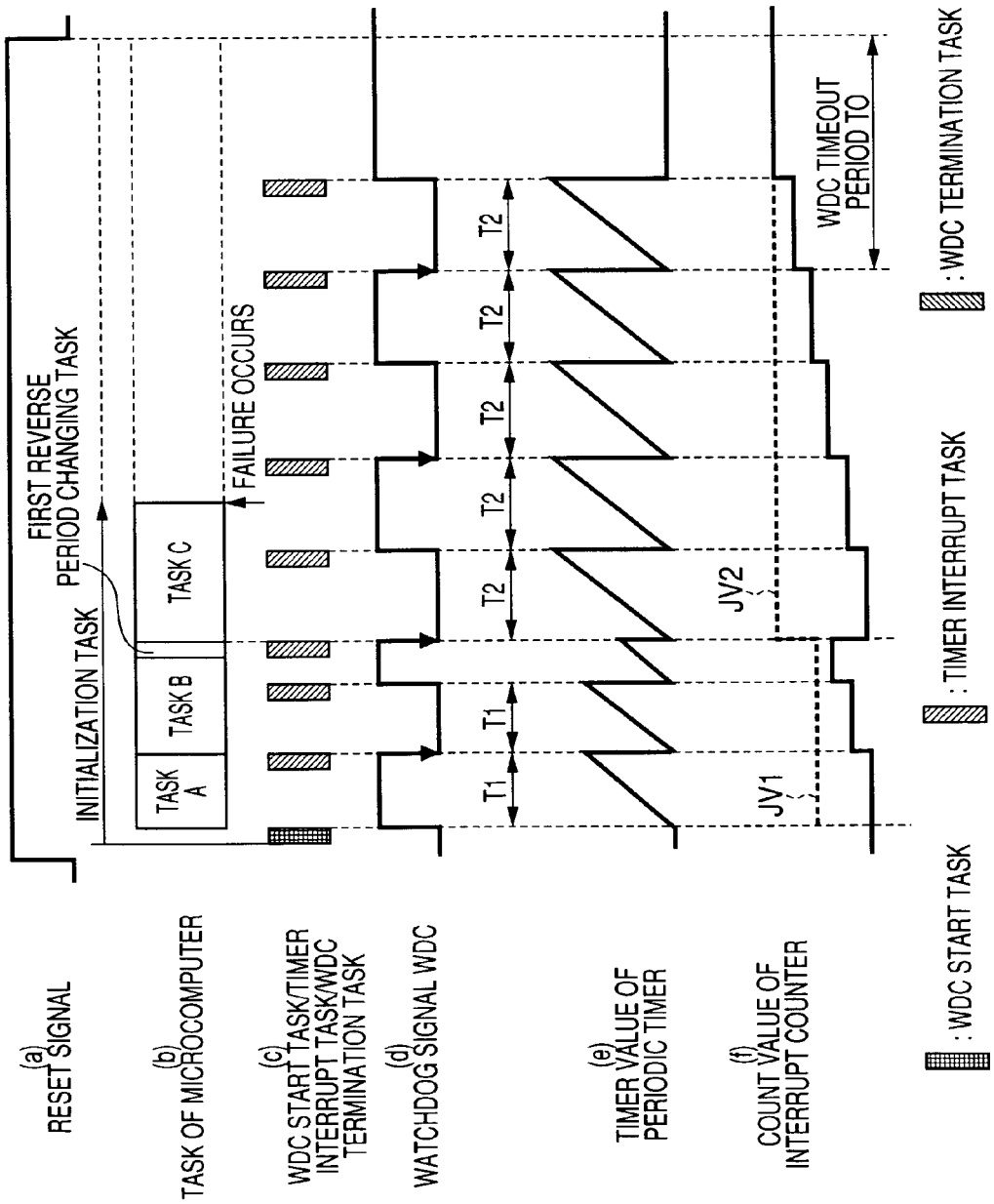

MALFUNCTION MONITORING METHOD AND SYSTEM

CROSS REFERENCE TO RELATED APPLICATIONS

This application is based on Japanese Patent Application 2005-165805 filed on Jun. 6, 2005. This application claims the benefit of priority from the Japanese Patent Application, so that the descriptions of which are all incorporated herein by reference.

FIELD OF THE INVENTION

The present invention relates to malfunction monitoring methods and systems, which are capable of monitoring malfunction of a processing unit, such as a microcomputer, to be preferably used for ECUs (Electronic Control Units) of vehicles, and to reset (reboot) or interrupt the device if it is determined that the device is presumed to be malfunctioning.

BACKGROUND OF THE INVENTION

Conventional ECUs for vehicles, to secure high reliability thereof, are installed with a process designed to monitor execution of a program of a microcomputer installed therein and to reboot the microcomputer to prompt it in case the program execution is interrupted or hung for some reasons.

As an example of such a process, a custom watchdog IC (Integrated Circuit) is provided to be electrically connected to a microcomputer; this watchdog IC has the monitor and reboot functions. Specifically, the watchdog IC is designed to monitor execution of a program of the microcomputer and to reboot the microcomputer based on the monitored result. An example of the structure with the watchdog IC, which can realize such a malfunction monitoring process, is typically disclosed in Japanese Unexamined Patent Publication No. H07-114490 (see FIG. 29).

As illustrated in FIG. 29, with the structure disclosed in the Publication No. H07-114490, in order to substantiate the malfunction monitoring process, a watchdog IC 102 is configured to be electrically connected to a microcomputer 101 as a target to be monitored.

In the malfunction monitoring process, the microcomputer is configured such that an interrupt occurs every predetermined period during execution of a program, such as an initialization program. If it is determined that a task with low priority is not executed by the microcomputer during execution of the program even though the number of interrupts reaches a predetermined number, the watchdog IC is configured to reset the microcomputer.

With the malfunction monitoring process disclosed in the Publication No. H07-114490, the order of the priority of all tasks included in the program need to be managed to change the algorithm of the program or the specs on the microcomputer. This may cause deterioration of the maintainability of the program to be inevitable.

SUMMARY OF THE INVENTION

In view of the background, an object of an aspect of the present invention is to provide malfunction monitoring method and system, which are capable of restoring, to its normal condition, a device during abnormal execution of a program with the maintainability of the program kept high.

According to one aspect of the present invention, there is provided a method of monitoring a watchdog signal output from a processing unit during execution of a program and of determining that the processing unit is presumed to be malfunctioning, upon lack of change in the monitored watchdog signal within a predetermined timeout period. The method includes generating an interrupt to the processing unit every predetermined period. The predetermined period is shorter than the predetermined timeout period. The watchdog signal is changed in response to each of the generated interrupts. The method also includes disabling the interrupt generation, upon the last interrupt being generated over an estimated time when the execution of the program is estimated to be completed.

According to another aspect of the present invention, there is provided a system for monitoring a watchdog signal output from a processing unit during execution of a program and for determining that the processing unit is presumed to be malfunctioning, upon lack of change in the monitored watchdog signal within a predetermined timeout period. The system includes a generating unit configured to generate an interrupt to the processing unit every predetermined period. The predetermined period is shorter than the predetermined timeout period. The watchdog signal is changed in response to each of the generated interrupts. The system also includes a disabling unit configured to disable the interrupt generation of the generating unit, upon the last interrupt being generated over an estimated time when the execution of the program is estimated to be completed.

BRIEF DESCRIPTION OF THE DRAWINGS

Other objects and aspects of the invention will become apparent from the following description of embodiments with reference to the accompanying drawings in which:

FIG. 12 is a flowchart schematically illustrating an initialization task of the program execution unit according to a second embodiment of the present invention;

FIG. 13 is a flowchart schematically illustrating an off-task of the program execution unit according to the second embodiment;

FIG. 21 is a flowchart schematically illustrating a first reverse period changing task included in the initialization task of the program execution unit according to the fourth embodiment;

FIG. 22 is a flowchart schematically illustrating a second reverse period changing task included in the initialization task of the program execution unit according to the fourth embodiment;

FIG. 23 is a timing chart schematically illustrating an embodiment of a watchdog signal reversing processing executed by the microcomputer and that of a malfunction monitoring processing executed by the watchdog IC according to the fourth embodiment;

FIG. 24 is a timing chart schematically illustrating another embodiment of the watchdog signal reversing processing executed by the microcomputer and that of the malfunction monitoring processing executed by the watchdog IC according to the fourth embodiment;

DETAILED DESCRIPTION OF EMBODIMENTS OF THE INVENTION

Embodiments of the present invention will be described hereinafter with reference to the accompanying drawings.

First Embodiment

A first embodiment of the present invention will be described hereinafter with reference to FIGS. 1 to 11. In the first embodiment, malfunction monitoring method and system are applied to an ECU 100 for controlling in-vehicle devices.

Figure 1:
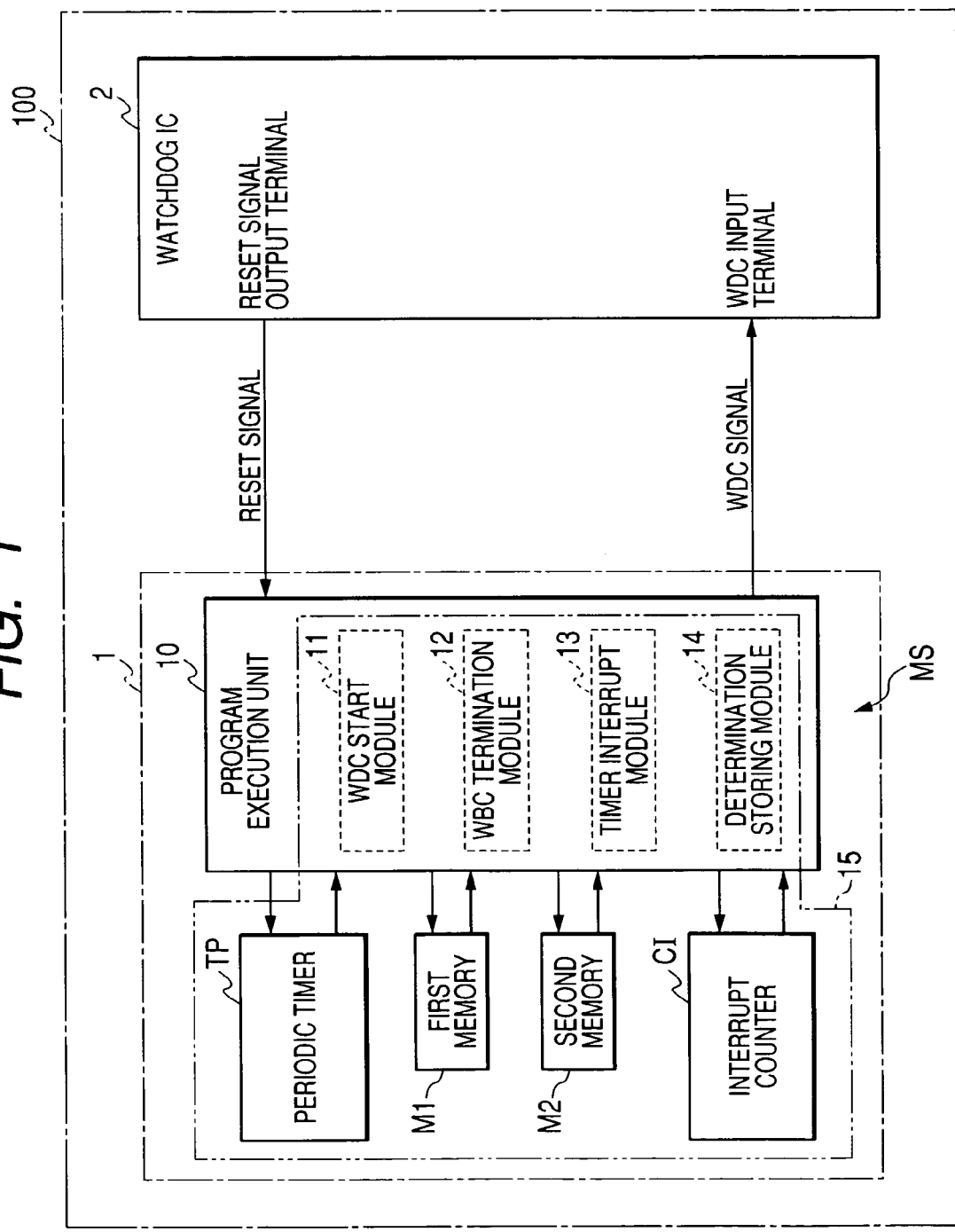
FIG. 1 is a block diagram schematically illustrating an example of the configuration of an electronic control unit according to a first embodiment of the present invention.

Referring to the drawings, in which like reference characters refer to like parts in several views, particularly to FIG. 1, there is illustrated the ECU 100 in which a malfunction monitoring system MS has been installed according to the first embodiment.

The malfunction monitoring system MS is configured to monitor execution of a program of a microcomputer 1 installed in the ECU 100 through a watchdog IC 2 installed therein. The malfunction monitoring system MS is also configured to enable the watchdog IC 2 to reboot the microcomputer 1 to prompt the program if it is determined that the microcomputer 1 is presumed to be malfunctioning, such as the program is interrupted or hung.

An example of the structure of the malfunction monitoring system MS and that of the functional structure of the microcomputer 1 are schematically illustrated in FIG. 1; these structures will be described in detail hereinafter.

As illustrated in FIG. 1, in the malfunction monitoring system MS, the watchdog IC 2 is electrically connected to the microcomputer 1. The watchdog IC 2 in integrated on/in a chip external to the microcomputer 1, but the watchdog IC 2 can be included within the same chip as the microcomputer 1.

The watchdog IC 2 is integrated with a watchdog timer. The watchdog IC 2 has a reset signal output terminal and an input terminal (WDC input terminal) to which a watchdog signal WDC is input from a WDC output port of the microcomputer 1. The watchdog IC 2 is designed to monitor, based on the progression of the input watchdog signal WDC, whether the microcomputer 1 is presumed to be malfunctioning, such as a program is interrupted or hung.

Specifically, the watchdog IC 2 is configured to reset the watchdog timer every time the trailing edge of the watchdog signal at which its logical level is changed from a high level to a low level is detected within a predetermined watchdog timeout period TO.

In contrast, if it is determined that the trailing edge of the watchdog signal is not detected within the watchdog timeout period TO due to some abnormal execution of a program, the watchdog IC 2 is configured to output, from the reset signal output terminal, a reset signal with low active to a reset signal input port of the microcomputer 1. The reset signal resets (reboots) the microcomputer 1. This can prompt the microcomputer 1 to rerun the program.

As illustrated in FIG. 1, the microcomputer 1 is composed of a program execution unit 10, a first memory M1, a second memory M2, a periodic timer TP, and an interrupt counter CI. The first and second memories M1 and M2, the periodic timer TP, and the interrupt counter CI are electrically connected to the program execution unit 10.

The periodic timer TP is, for example, operative to:

count up from a default value;

reset the count value (timer value) in response to every interrupt period instructed by the program execution unit 10; and generate an interrupt to the program execution unit 10 every time the timer value reaches a predetermined timer value PE set in correspondence with the interrupt period.

The interrupt counter CI is operative to count the number of interrupts generated by the periodic timer TP.

The first memory M1 is, for example, a RAM serving as a working memory of the program execution unit 10. Specifically, the first memory M1 allows the program execution unit 10 to temporally store data therein halfway through tasks and/or data representing results of the tasks.

The second memory M2 is, for example, a flash ROM storing therein initial data and/or various types of programs, such as an initialization program that is executed at power-up, normal task programs for controlling the in-vehicle devices, and an off-task program that causes the program execution unit 10 to execute various tasks required at power-off of the microcomputer 1. These programs and initial data are required for the program execution unit 10 to control the in-vehicle devices The first and second memories M1 and M2 are designed such that the writing speed for the first memory M1 is faster than that for the second memory M2.

The program execution unit 10 is operative to execute the various types of programs installed in the second memory M2. Each of the initialization program and the off-task program in the various types of programs to be executed by the microcomputer 1 is designed to a sequential program consisting of a plurality of sequential-processing tasks.

For example, in the first embodiment, the initialization program consists of a plurality of sequential tasks A to D.

The program execution unit 10 is operatively composed of a WDC start module 11, a WDC termination module 12, a timer interrupt module 13, and a determination storing module 14. The program execution unit 10 is operative to control the watchdog signal WDC in cooperation with the modules 11 to 14 upon execution of the initialization program and the off-task program.

Note that, in the malfunction monitoring system MS, as illustrated by the two-dot chain line in FIG. 1, the periodic timer TP, the interrupt counter CI, the WDC start module 11, the WDC termination module 12, the timer interrupt module 13, and the determination storing module 14 constitute a monitoring control unit 15.

Next, the sequential-processing tasks to be executed by the program execution unit 10 in accordance with, for example, the initialization program will be described hereinafter with reference to the flowcharts illustrated in FIGS. 2 to 5.

Figure 2A:
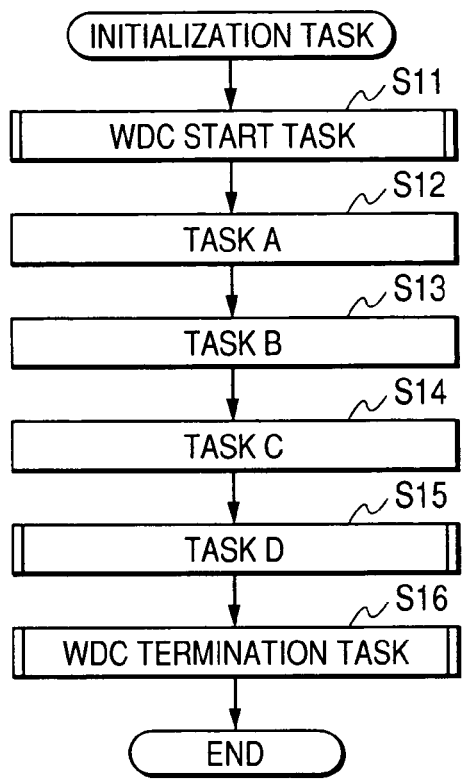
FIG. 2A is a flowchart schematically illustrating an initialization task of a program execution unit illustrated in FIG. 1.

As illustrated in FIG. 2A, in the program execution unit 10, upon start of the initialization program, the WDC start module 11 executes a WDC start task in step S11. Thereafter, the program execution unit 10 serially runs the tasks A, B, C, and D in this order (steps S12 to S15). After completion of the execution of the serial tasks A to D, the WDC termination module 12 executes a WDC termination task in step S16.

In the first embodiment, the task D is defined such that the period required for the program execution unit 10 to execute the task D is longer than the watchdog timeout period TO.

Figure 2B:
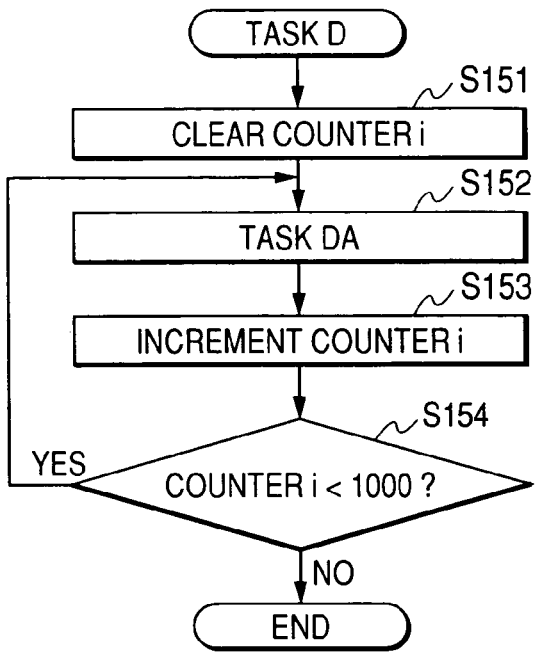
FIG. 2B is a flowchart schematically illustrating a task D included in the initialization task of the program execution unit illustrated in FIG. 1.

Specifically, as illustrated in FIG. 2B, when executing the task D, the program execution unit 10 clears a counter i for example inside the microcomputer 1. Next, the program execution unit 10 executes a task DA in step S152, and thereafter, increments the counter i. Subsequently, the program execution unit 10 determines whether the counter i is less than 1000 in step S154. If it is determined that the counter i is less than 1000 (the determination in step S154 is YES), the program execution unit 10 returns to step S152 and repeatedly executes the steps S152 to S154 until it is determined that the counter i is not less than 1000 (the determination in step S154 is NO).

In the first embodiment, the initialization program includes the tasks A to D as the sequential-processing tasks, but the number of the sequential-processing tasks can be changed.

Next, the WDC start task to be executed by the WDC start module 11 of the program execution unit 10 will be described hereinafter with reference to the flowchart illustrated in FIG. 3.

Figure 3:
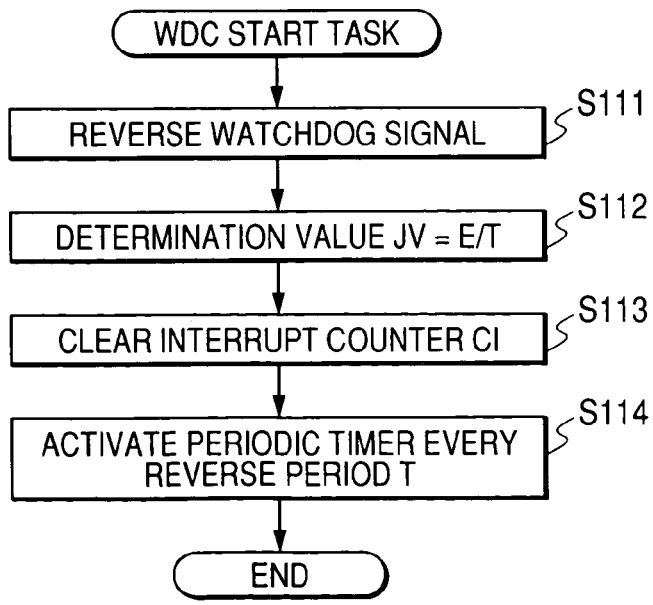
FIG. 3 is a flowchart schematically illustrating a WDC (Watchdog Control) start task included in the initialization task of the program execution unit illustrated in FIG. 1.

Specifically, the WDC start module 11 reverses the logical level of the watchdog signal WDC in step S111 of FIG. 3.

Next, the WDC start module 11 calculates a determination value JV based on a period within which the initialization program is presumed to be completed in step S112; this determination value JV is used upon execution of the timer interrupt program described hereinafter as a reference value to be used when the initialization program is normally executed.

For example, in step S112, the WDC start module 11 calculates the determination value JV in accordance with the following equation:

$$JV = E/T$$

Where E represents a timeout period slightly longer than a period within which execution of the initialization program is presumed to be completed, and T represents a reverse period in which the periodic timer TP generates an interrupt to the program execution unit 10; this reverse period T is shorter than the watchdog timeout period TO.

The WDC start module 11 stores the determination value JV in the determination storing module 14 in step S112.

Specifically, the determination value JV represents the number of reverse of the logical level of the watchdog signal WDC until the timeout period E has elapsed since the start of the initialization task.

Next, the WDC start module 11 clears the interrupt counter CI in step S113, and thereafter, activates the periodic timer TP in the reverse period T as the interrupt period in step S114. This allows interrupts periodically generated by the periodic timer TP to be input to the program execution unit 10.

The timer interrupt module 13 of the program execution unit 10 executes a timer interrupt task every time the interrupt is generated by the periodic timer TP to be input to the program execution unit 10. The timer interrupt task to be executed by the timer interrupt module 13 of the program execution unit 10 will be described hereinafter with reference to the flowchart illustrated in FIG. 4.

Specifically, the timer interrupt module 13 increments a count value of the interrupt counter CI in step S21. That is, in step S21, the timer interrupt module 13 counts the number of reverse of the logical level of the watchdog signal WDC by counting the number of interrupts generated by the periodic timer TP. Next, in step S22, the timer interrupt module 13 determines whether the count value of the timer interrupt counter CI is equal to or more than the determination value JV, in other words, whether execution of the initialization program is completed within the timer-out period E.

If it is determined that the count value of the timer interrupt counter CI is less than the determination value JV (the determination in step S22 is NO), the timer interrupt module 23 reverses the logical level of the watchdog signal WDC, exiting the timer interrupt task.

Otherwise if it is determined that the count value of the timer interrupt counter CI is equal to or more than the determination value JV (the determination in step S22 is YES), the timer interrupt module 23 disables interrupts from the periodic timer TP, going into an infinite loop in step S25. The disabling interrupt allows the reverse of the logical level of the watchdog signal WDC to be prevented. This results in that the microcomputer 1 is in standby, waiting for the reset signal to be output from the watchdog IC 2.

Next, the WDC termination task to be executed by the WDC termination module 12 of the program execution unit 10 will be described hereinafter with reference to the flowchart illustrated in FIG. 5.

Specifically, the WDC termination module 12 reverses the logical level of the watchdog signal WDC in step S161.

Next, the WDC termination module 12 stops the operation of the periodic timer TP in step S162. Specifically, generation of interrupts by the periodic timer TP is stopped depending on completion of the initialization program, resulting that the counting operation of the timer interrupt counter CI is stopped.

For this reason, if execution of the initialization program is normally completed, the count value CI would be equal to or smaller than the determination value JV, and therefore the microcomputer 1 would nor be reset by the watchdog IC 2.

As described above, in the first embodiment, upon execution of the initialization program, the watchdog signal WDC reversing processing is configured to be repeatedly executed independently of the descriptions of the initialization program.

Figure 6:
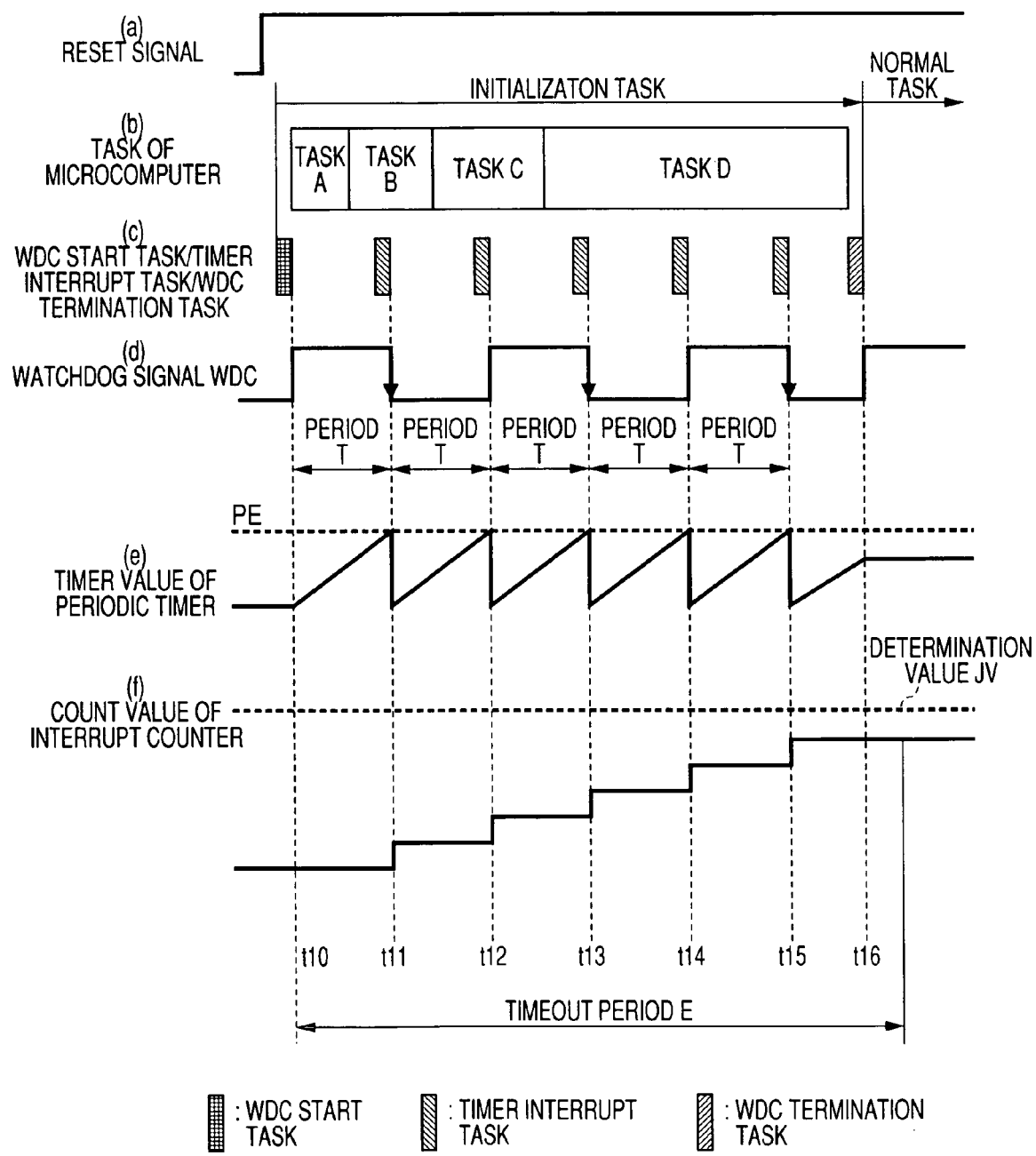
FIG. 6 is a timing chart schematically illustrating an embodiment of a watchdog signal reversing processing executed by a microcomputer illustrated in FIG. 1 and that of a malfunction monitoring processing executed by a watchdog IC illustrated in FIG. 1 according to the first embodiment.
Figure 7:
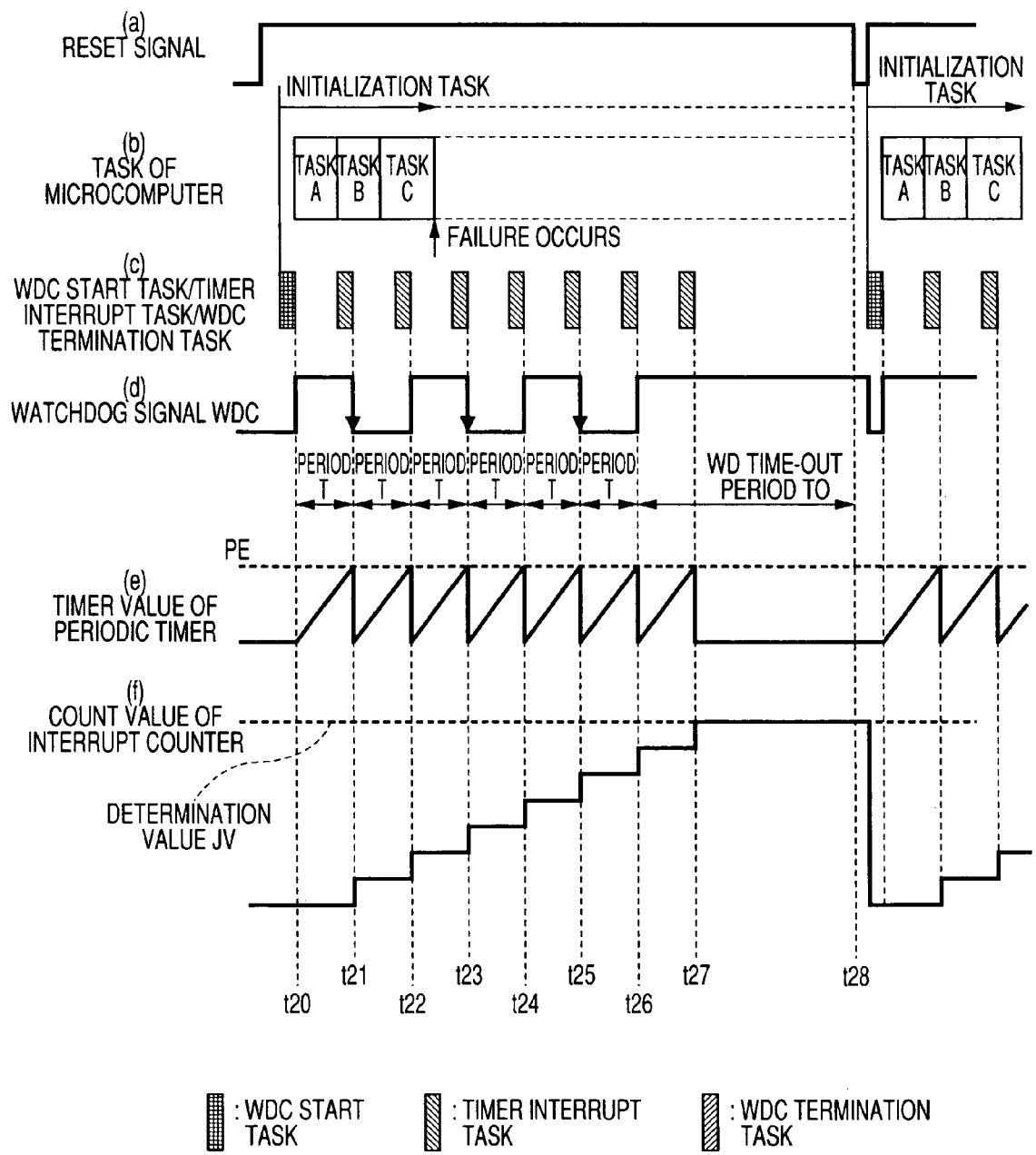
FIG. 7 is a timing chart schematically illustrating another embodiment of the watchdog signal reversing processing and that of the malfunction monitoring processing according to the first embodiment.

FIG. 6 illustrates an embodiment of the watchdog signal reversing processing executed by the microcomputer 1 and that of the malfunction monitoring processing executed by the watchdog IC 2; FIG. 7 illustrates another embodiment of the watchdog signal reversing processing executed by the microcomputer 1 and that of the malfunction monitoring processing executed by the watchdog IC 2.

Malfunction monitoring method according to the first embodiment will be described in detail hereinafter. Note that, in the first embodiment, the determination value JV is set to "7".

First, the embodiment of the watchdog signal reversing processing executed by the microcomputer 1 and that of the malfunction monitoring processing executed by the watchdog IC 2 when execution of the initialization program has been normally completed will be described with reference to the timing chart of FIG. 6.

As illustrated by (a) of FIG. 6, in the microcomputer 1, when the reset signal is set to a logical high level (inactive level) in response to power up of the microcomputer 1, execution of the initialization program is started (see (b) of FIG. 6)

Specifically, as illustrated in FIGS. 2A and 3, upon start of the initialization program, the WDC start task is executed (see (c) of FIG. 6). The execution of the WDC start task reverses the logical level of the watchdog signal WDC from a low level to a high level at a timing t10 (see (d) of FIG. 6), and activates the periodic timer TP (see (e) of FIG. 6). This permits the periodic timer TP to periodically generate, to the program execution unit 10, an interrupt every reverse period T.

Figure 4:
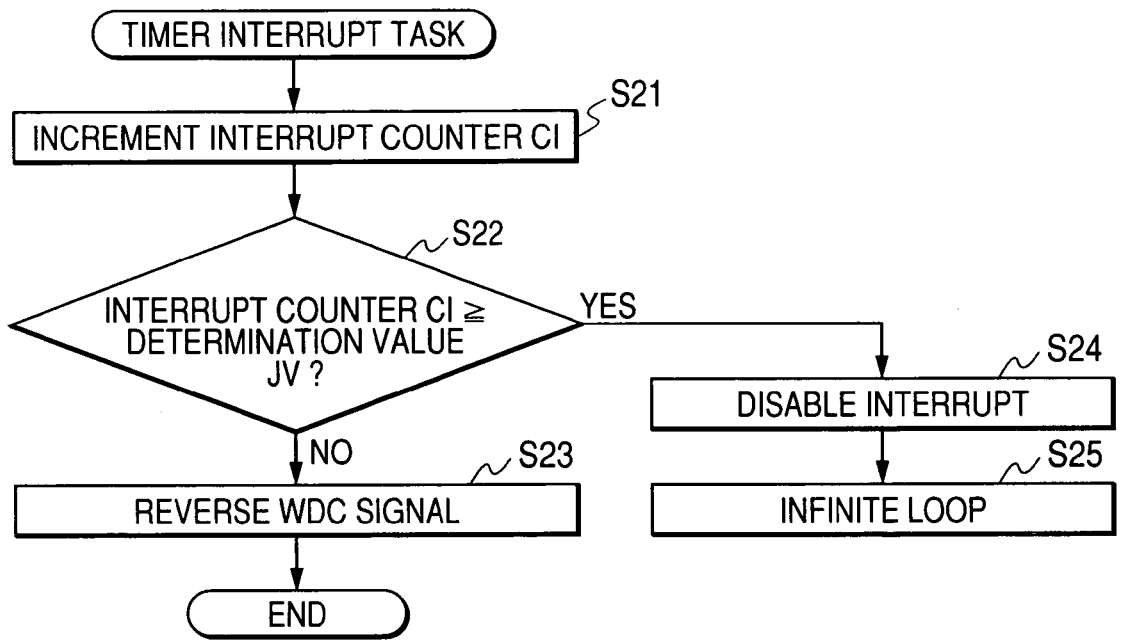
FIG. 4 is a flowchart schematically illustrating a timer interrupt task of the program execution unit illustrated in FIG. 1.

Thereafter, as illustrated by (b) of FIG. 6, the tasks A to D are sequentially executed by the program execution unit 10, and parallely the timer interrupt task is executed by the timer interrupt task module 13 in response to every generation of the interrupt by the periodic timer TP (see FIG. 4).

As illustrated by (e) of FIG. 6, the timer interrupt task is executed every time the timer value of the periodic timer TP reaches a predetermined timer value PE set in correspondence with the reverse period T.

Specifically, at a timing t11 when the reverse period T has elapsed since the timing t10, the timer value of the periodic timer TP reaches the predetermined timer value PE so that the timer interrupt task is executed. Because the periodic timer TP is activated at the timing t11 (see step S114 of FIG. 3), the timer value thereof is reset, and the periodic timer TP starts to count up from the default value at the timing t11.

The timer interrupt tasks are therefore executed by the timer interrupt module 13 at the timings t11, t12, t13, t14, and t15 each of which the timer value of the periodic timer TP reaches the predetermined timer value PE (see FIG. 4).

As a result, as illustrated by (d) of FIG. 6, the watchdog signal WDC whose logical level is reversed every reverse period T is output from the microcomputer 1 to the watchdog IC 2.

In addition, as illustrated by (f) of FIG. 6, the count value of the interrupt counter CI is incremented every time the timer interrupt task is executed.

Figure 5:
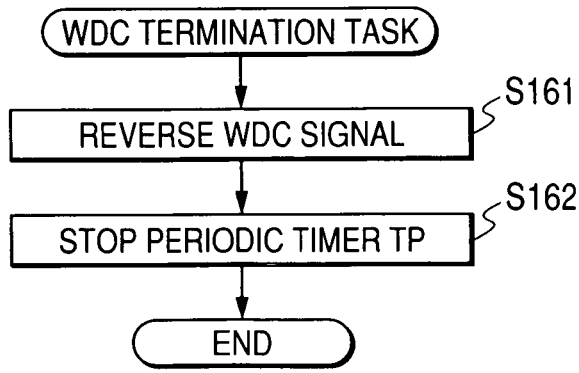
FIG. 5 is a flowchart schematically illustrating a WDC termination task included in the initialization task of the program execution unit illustrated in FIG. 1.

If execution of the initialization program has been normally completed, as illustrated by (c) of FIG. 6, in the microcomputer 1, the WDC termination task is executed after completion of the task D (see FIG. 5). Completion of execution of the WDC termination task will cause the periodic timer TP to stop generation of an interrupt at a timing t16 of the completion of execution of the WDC terminal task (see step S162 of FIG. 5 and (e) of FIG. 6). This results in that the increment of the count value of the interrupt counter CI is stopped.

Subsequent to completion of the initialization program, the normal task programs are executed by the program execution unit 10 of the microcomputer 1. Execution of each of the normal task programs is monitored by the watchdog IC 2 using at least one of heretofore known malfunction monitoring processes, such as one disclosed in the Japanese Unexamined Patent Publication No. H07-114490.

Second, another embodiment of the watchdog signal reversing processing executed by the microcomputer 1 and that of the malfunction monitoring processing executed by the watchdog IC 2 if it is determined that the microcomputer 1 is presumed to be malfunctioning, such as the initialization program is interrupted or hung, will be described with reference to the timing chart of FIG. 7.

As illustrated by (a) to (f) of FIG. 7, when the periodic timer TP is activated at a timing t20 corresponding to the timing t10 in FIG. 6, an interrupt is generated by the periodic timer TP every reverse period T.

If a failure occurs in the microcomputer 1 during execution of, for example, the task C of the initialization program so that the execution is interrupted (see (b) of FIG. 7), the WDC termination task would not be executed after the interruption of the task C. In this case, non-execution of the WDC termination task allows the periodic timer TP to continuously generate an interrupt every reverse period T. This results in that the timer interrupt tasks are executed by the timer interrupt module 13 at timings t21, t22, t23, t24, and t25 corresponding to the timings t11, t12, t13, t14, and t15 in FIG. 6, and after the timing t25, the timer interrupt tasks are continuously executed.

The count value of the interrupt counter CI is therefore continuously incremented depending on the continuous timer interrupt tasks (see (f) of FIG. 7).

When the count value of the interrupt counter CI is incremented at each of the timings t26 and t27, the count value is equal to or more than the determination value JV, which permits the microcomputer 1 to enter into the infinite loop. This results in that the microcomputer 1 is in standby, waiting for the reset signal to be output from the watchdog IC 2, and that interrupts are disabled from the periodic timer TP (see steps S22, S24, and S25 in FIG. 4).

As a result, as illustrated by (d) of FIG. 7, at a timing t28, the length of time that has elapsed from the last trailing edge of the watchdog signal WDC before the reverse is stopped exceeds the watchdog timeout period TO. In other words, the length of time that has elapsed from the trailing edge of the watchdog signal WDC at the timing t 25 exceeds the watchdog timeout period TO.

This permits the watchdog IC 2 to turn the logical level of the reset signal from the high level to a low level (active level) to be input to the microcomputer 1 (see (a) of FIG. 7). This reboots (resets) the microcomputer 1, so that the initialization program is rerun by the microcomputer 1 as illustrated by (b) of FIG. 7.

On the other hand, a comparative example of a malfunction monitoring process will be described hereinafter with reference to FIGS. 8 to 11.

Figure 8:
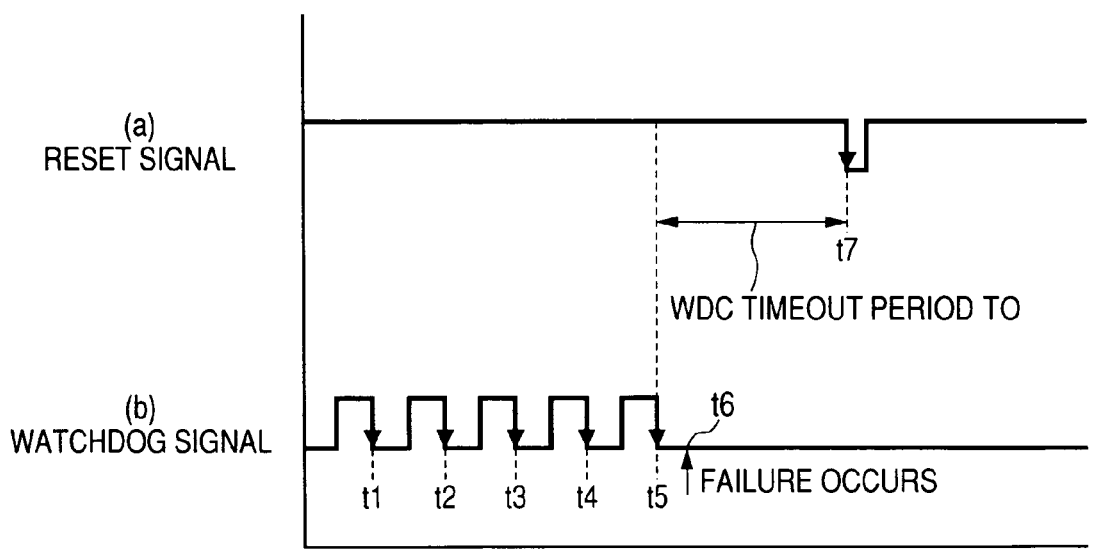
FIG. 8 is a timing chart schematically illustrating an embodiment of a watchdog signal reversing processing and that of a malfunction monitoring processing according to a comparative example of the first embodiment.

As illustrated by (b) of FIG. 8, in the comparative example, the WDC signal is output from the WDC output port of the microcomputer 1 with its logical level being periodically reversed. Trailing edges of the WDC signal at timings t1 to t5 illustrated by (b) of FIG. 8 at each of which the logical level of the WDC signal is reversed from a logical high level to a logical low level is detected by the watchdog IC 2. Every time the trailing edge of the WDC signal is detected by the watchdog IC 2, the watchdog timer is reset.

If no trailing edges are detected by the watchdog IC 2 within a predetermined watchdog timeout period TO, the reset signal with a low level (active level) is output from the reset signal output terminal of the watchdog IC 2 to the reset signal input port of the microcomputer 1, which allows the microcomputer 1 to be reset.

For example, as illustrated by (b) of FIG. 8, if a failure occurs at a timing t6 in the microcomputer 1 during execution of the initialization program so that the execution is interrupted, no watchdog signal WDC is output from the microcomputer 1 to the watchdog IC 2 after the timing t6. This causes the watchdog IC 2 to output the reset signal to the microcomputer 1 at a timing t7 after the watchdog timeout period TO1 has elapsed since the timing t5 (see (a) of FIG. 8).

In addition, in the comparative example, to output the watchdog signal WDC, the logical level of the watchdog signal WDC need be reversed in given cycles each of which is shorter than the watchdog timeout period TO.

Figure 9A:
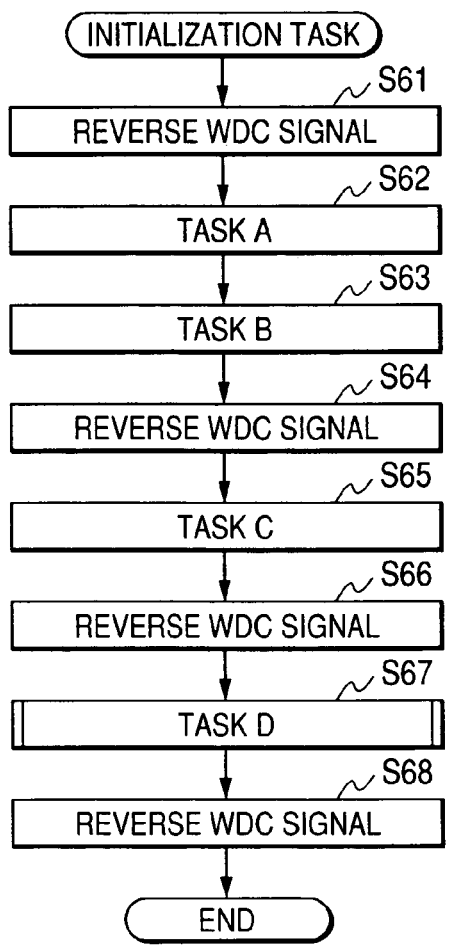
FIG. 9A is a flowchart schematically illustrating an initialization task of a program execution unit according to the comparative example of the first embodiment.

Specifically, in FIG. 9A, if the tasks A to D of the initialization program are sequentially executed, the total execution time may exceed the watchdog timeout period TO.

In this case, as illustrated by (a) of FIG. 9A, processes for reversing the WDC signal are executed by the program execution unit 10 (see steps S61, S64, S66, and S68 as an example) before and after steps S62, S63, S65, and S67 for executing the corresponding tasks A, B, C, and D.

Moreover, as described above, the task D is defined such that the period required for the program execution unit 10 to execute the task D is longer than the watchdog timeout period TO.

Figure 9B:
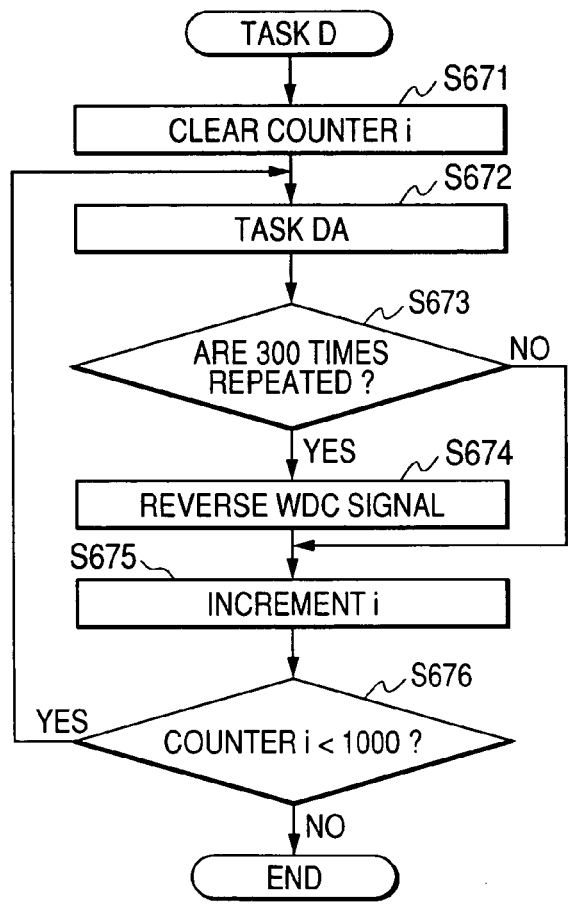
FIG. 9B is a flowchart schematically illustrating a task D included in the initialization task of the program execution unit according to the comparative example of the first embodiment.

Specifically, in FIG. 9B, after the counter i is cleared (step S671), the process for reversing the watchdog signal WDC is executed by the program execution unit 10 (step S674) every time the set of steps S672, S673, S675, and S676 required to repeat the task DA are repeated by the program execution unit 10 at 300 times.

The execution in the step S674 allows the logical level of the watchdog signal WDC to be reversed within the watchdog timeout period TO.

Figure 10:
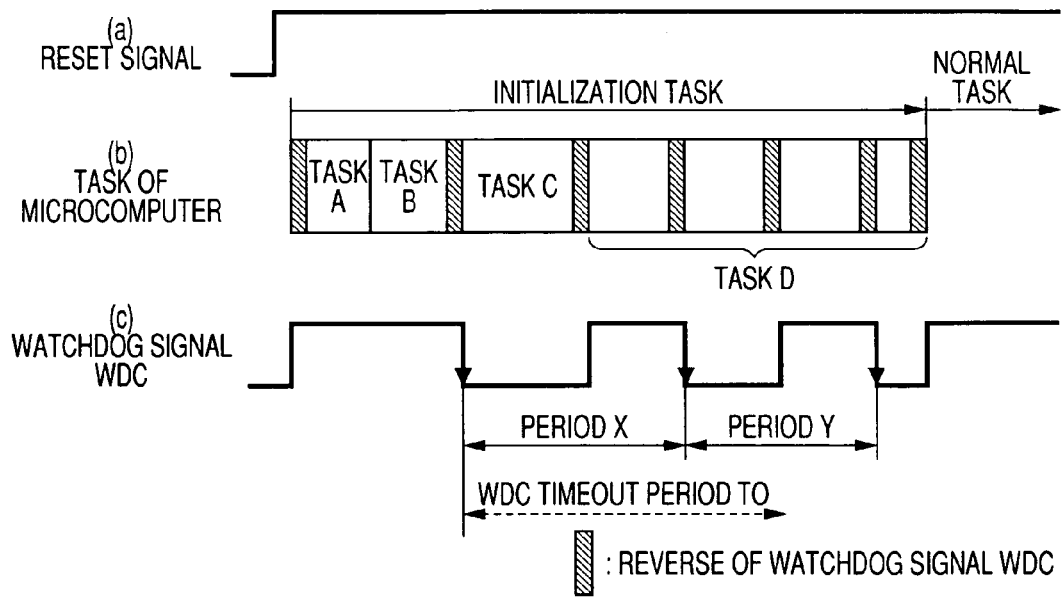
FIG. 10 is a timing chart schematically illustrating a further embodiment of the watchdog signal reversing processing and that of the malfunction monitoring processing according to the comparative example of the first embodiment.
Figure 11:
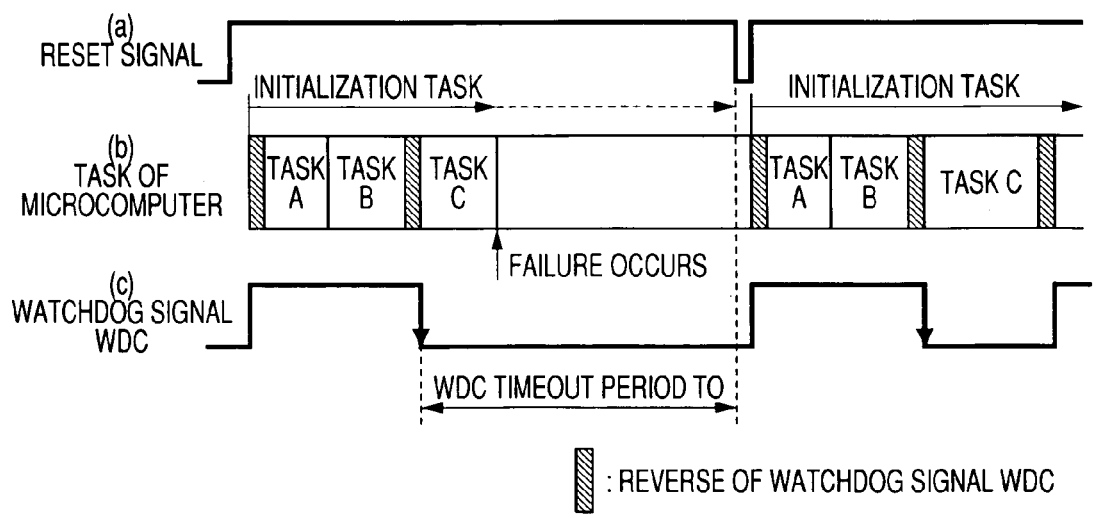
FIG. 11 is a timing chart schematically illustrating a still further embodiment of the watchdog signal reversing processing and that of the malfunction monitoring processing according to the comparative example of the first embodiment.

FIG. 10 illustrates a further embodiment of the watchdog signal reversing processing executed by the microcomputer 1 and that of the malfunction monitoring processing executed by the watchdog IC 2 according to the comparative example of the first embodiment. FIG. 11 illustrates a still further embodiment of the watchdog signal reversing processing executed by the microcomputer 1 and that of the malfunction monitoring processing executed by the watchdog IC 2 according to the comparative example of the first embodiment.

As illustrated by (b) of FIG. 10, in the microcomputer 1, in response to power up thereof, execution of the initialization program is started.

Specifically, the logical level of the watchdog signal WDC is reversed in given periods each of which is shorter than the watchdog timeout period TO (see step S61 of FIG. 9A). This allows the microcomputer 1 to output the watchdog signal WDC whose transition is illustrated by (c) of FIG. 10.

During output of the watchdog signal WDC, the trailing edges of the watchdog signal WDC are detected by the watchdog IC 2 in given periods, such as X period and Y period, each of which is shorter than the watchdog timeout period TO, so that the watchdog timer is reset at each detecting timing. This can prevent the watchdog IC 2 from outputting the reset signal with the low level (see (a) of FIG. 10).

Subsequent to completion of the initialization program, the normal task programs are executed by the program execution unit 10 of the microcomputer 1.

On the other hand, if a failure occurs in the microcomputer 1 during execution of, for example, the task C of the initialization program so that the execution is interrupted (see (b) of FIG. 11), no reverse processes of the WDC signal would be executed after the interruption of the task C.

This results in that, as illustrated by (c) of FIG. 11, the watchdog IC 2 cannot detect edges of the watchdog signal WDC even if the watchdog timeout period TO has elapsed since the last trailing edge of the watchdog signal WDC. This causes the watchdog IC 2 to output the reset signal with the low level to the microcomputer 1 at the timing when the watchdog timeout period TO has elapsed, thereby resetting the microcomputer 1. After reset of the microcomputer 1, the initialization program is rerun by the microcomputer 1 as illustrated by (b) of FIG. 11.

As described above, in the malfunction monitoring method and system MS according to the first embodiment, upon start of the initialization program, the WDC start module 11 activates the periodic timer TP. This causes the periodic timer TP to periodically generate, to the program execution unit 10, an interrupt every reverse period T shorter than the watchdog timeout period TO (see step S114).

In response to each of the interrupts generated by the periodic timer TP, the timer interrupt module 13 reverses the logical level of the watchdog signal WDC (see step S23). The WDC termination module 12 causes the periodic timer TP to stop generation of an interrupt (see step S162).

In addition, the timer interrupt module 13 counts the number of reverse of the logical level of the watchdog signal WDC by counting the number of interrupts generated by the periodic timer TP (see step S21).

If it is determined that the count value of the timer interrupt counter CI is equal to or more than the determination value JV (the determination in step S22 is YES), the timer interrupt module 23 disables interrupts from the periodic timer TP (steps S24 and S25). This allows the reset signal with the low level input to the microcomputer 1 to reset the microcomputer 1 (steps S24 and S25).

Specifically, in the first embodiment, an interrupt is generated independently of the set of the sequential tasks A to D of the initialization program. In this structure, if a failure occurs in the microcomputer 1 during execution of the sequential tasks A to D of the initialization program, an interrupt occurs over the timeout period E corresponding to a period within which the initialization program is presumed to be completed.

In other words, as illustrated in FIG. 7, if a failure occurs in the microcomputer 1 during execution of the sequential tasks A to D of the initialization program, an interrupt occurs at the timing t27 corresponding to the determination value JV obtained based on the timeout period E. This state shows that a failure occurs in the microcomputer 1 during execution of the sequential tasks A to D of the initialization program.

In the first embodiment, the timer interrupt module 12 determines that the failure in the determination in step S22, and prevents the periodic timer TP from generating an interrupt, thereby avoiding reverse of the watchdog signal WDC after the timing t27 This makes it possible to reset the microcomputer 1, thereby securely restoring the microcomputer 1 to its normal state.

On the other hand, regarding the comparative example, if the initialization program execution time exceeds the watchdog timeout period TO, it is necessary to estimate the execution time and to appropriately insert the watchdog signal reversing tasks (see steps S61, S64, S66, and S68) in the sequential tasks A to D (see steps S62, S63, S65, and S67) based on the estimated execution time.

For this reason, even though the watchdog signal reversing tasks were properly inserted in the sequential task A to D in the beginning of the design of the initialization program, it may be necessary to redesign where the watchdog signal reversing tasks are inserted in the sequential steps A to D of the initialization program after the design.

In addition, if the number of repletion of tasks DA is changed, it may be necessary to redesign the number of reverse of the watchdog signal WDC based on a comparison with the watchdog timer-out period TO.

In contrast, in the first embodiment, the malfunction monitoring system MS is configured to reverse the watchdog signal WDC in response to an interrupt periodically generated independently of the set of the sequential tasks A to D of the initialization program.

For this reason, even if the need to change the algorithm of the initialization program and/or the specs of the microcomputer 1 should arise, it is unnecessary to redesign where the watchdog signal reversing tasks are inserted in the sequential steps A to D of the initialization program. In addition, even if the number of repeated task DA is changed, it is unnecessary to redesign the number of reverse of the watchdog signal WDC.

As described above, in the first embodiment, as compared with the comparative example, it is possible to eliminate the management associated with the state of the watchdog signal WDC, thereby keeping high the maintainability of the initialization program even in case of change therein.

Furthermore, the malfunction monitoring system MS is configured to determine whether a failure occurs in the microcomputer 1 during execution of the initialization program by comparing the discrete count-value of the interrupt counter CI representing the number of interrupts generated by the periodic timer TP with the discrete determination value JV corresponding to the discrete count-value.

This permits the load on the microcomputer 1 to be reduced, and the determination to be properly executed.

In the first embodiment, as described above, a period for which interrupts are generated by the periodic timer TP is obtained by counting the number of interrupts generated by the periodic timer TP. As another method, an external timer IC can be provided to directly measure the period.

As compared with another method, the method of obtaining the period by counting the number of interrupts generated by the periodic timer TP has an advantage in simplifying the hardware structure of the malfunction monitoring system MS because of nonuse of any external timer ICs, and in reducing the load on the microcomputer 1.

Second Embodiment

A second embodiment of the present invention will be described hereinafter with reference to FIGS. 1, 4, 5, and 12 to 17. Note that the hardware structure of the malfunction monitoring system according to the second embodiment will be substantially identical with that of the malfunction monitoring system MS according to the first embodiment.

The malfunction monitoring system according to the second embodiment is configured to calculate individually first and second determination values based on periods within which the initialization program and off-task program are presumed to be completed, respectively.

For example, in the second embodiment, the initialization program consists of a plurality of sequential tasks A1 to D1, and the off-task program consists of a plurality of sequential tasks A2 to D2. Like the first embodiment, each of the tasks D1 and D2 includes steps S151 to S154 illustrated in FIG. 2B, but the descriptions of the task DA are different from each other.

Next, the tasks to be executed by the program execution unit 10 in accordance with the initialization program and off-task program will be described hereinafter with reference to the flowcharts illustrated in FIGS. 5 and 12 to 15. Note that, in the second embodiment, the off-task program execution time and the initialization program execution time have the relationship in which the off-task program execution time is longer than the initialization program execution time.

As illustrated in FIG. 12, in the program execution unit 10, upon start of the initialization program, the WDC start module 11 executes a first WDC start task in step S31 Thereafter, the program execution unit 10 serially runs the tasks A1, B1, C1, and D1 in this order (steps S32 to S35). After completion of the execution of the serial tasks A1 to D1, the WDC termination module 12 of the program execution unit 10 executes a WDC termination task in step S36; this WDC termination task is substantially identical with the set of steps S161 and S162 illustrated in FIG. 5.

Moreover, as illustrated in FIG. 13, in the program execution unit 10, upon start of the off-task program, the WDC start module 11 executes a second WDC start task in step S41. Thereafter, the program execution unit 10 serially runs the tasks A2, B2, C2, and D2 in this order (steps S42 to S45). After completion of the execution of the serial tasks A2 to D2, the WDC termination module 12 of the program execution unit 10 executes a WDC termination task in step S46; this WDC termination task is substantially identical with the set of steps S161 and S162 illustrated in FIG. 5.

As described above, the program execution unit 10 is programmed to execute the first WDC start task upon execution of the initialization program, and to execute the second WDC start task upon execution of the off-task program.

Next, the first and second WDC start tasks to be executed by the WDC start module 11 of the program execution unit 10 will be described hereinafter with reference to the flowcharts illustrated in FIGS. 14 and 15, respectively.

First WDC Start Task

Figure 14:
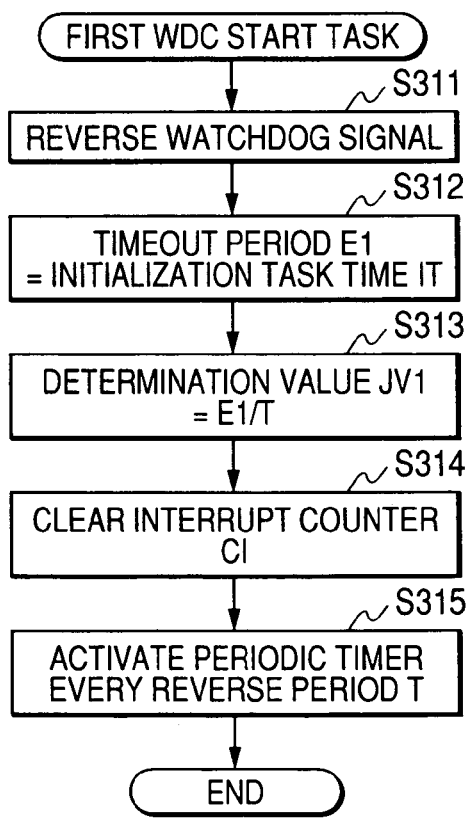
FIG. 14 is a flowchart schematically illustrating a first WDC start task included in the initialization task of the program execution unit according to the second embodiment.

Specifically, when starting the first WDC start task, the WDC start module 11 reverses the logical level of the watchdog signal WDC in step S311 of FIG. 14.

Next, the WDC start module 11 calculates a first timeout period E1 using an initialization task time IT slightly longer than the initialization program execution time in step S312. For example, in the second embodiment, the first timeout period E1 is set to be equal to the initialization task time IT. This allows the first timeout period E1 inherent in the initialization program to be set.

Subsequently, the WDC start module 11 determines the first determination value JV1 based on the first timeout period E1 and the reverse period T in step S313. For example, in step S313, the WDC start module 11 determines the first determination value JV1 in accordance with the following equation:

$$JV1 = E1/T$$

The WDC start module 11 stores the first determination value JV1 in the determination storing module 14 in step S313. This allows the first determination value JV1 inherent in the initialization program to be set.

Next, tie WDC start module 11 clears the interrupt counter CI (see FIG. 1) in step S314, and thereafter, activates the periodic timer TP (see FIG. 1) in tie reverse period T as the interrupt period in step S315. This allows interrupts periodically generated by the periodic timer TP to be input to the program execution unit 10.

Second WDC Start Task

Figure 15:
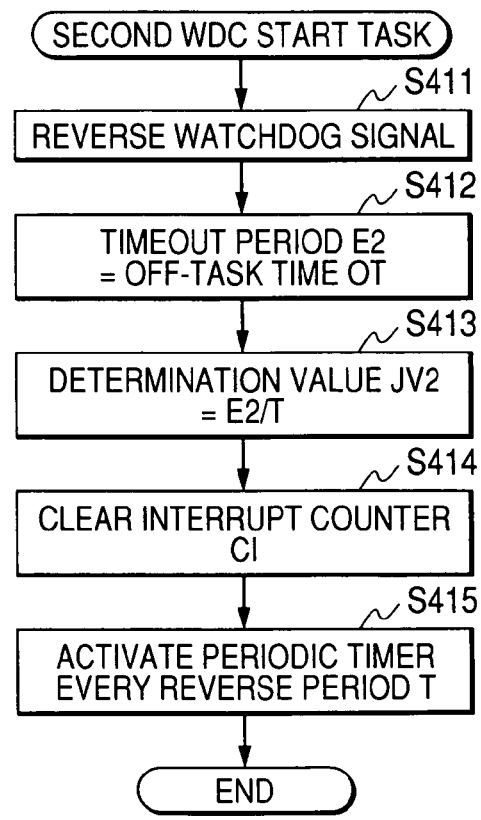
FIG. 15 is a flowchart schematically illustrating a second WDC start task included in the off-task of the program execution unit according to the second embodiment.

Specifically, when starting the second WDC start task, the WDC start module 11 reverses the logical level of the watchdog signal WDC in step S411 of FIG. 15.

Next, the WDC start module 11 calculates a second timeout period E2 using an off-task time OT slightly longer than the off-task program execution time in step S412. For example, in the second embodiment, the second timeout period E2 is set to be equal to the initialization task time IT. This permits the second timeout period E2 inherent in the off-task program to be set.

Subsequently, the WDC start module 11 determines the second determination value JV2 based on the second timeout period E2 and the reverse period T in step S413. For example, in step S413, the WDC start module 11 determines the second determination value JV2 in accordance with the following equation:

$$JV2 = E2/T$$

The WDC start module 11 stores the second determination value JV2 in the determination storing module 14 in step S413. The WDC start module 11 stores the first determination value JV1 in the determination storing module 14 in step S313. This allows the second determination value JV2 inherent in the off-task program to be set.

Next, the WDC start module 11 clears the interrupt counter CI (see FIG. 1) in step S414, and thereafter, activates the periodic timer TP (see FIG. 1) in the reverse period T as the interrupt period in step S415. This allows interrupts periodically generated by the periodic timer TP to be input to the program execution unit 10.

In the program execution unit 10 according to the second embodiment, the first and second determination values JV1 and JV2 are set for the initialization program and the off-task program through the first and second WDC start tasks, respectively. The program execution unit 10 compares each of the first and second determination values JV1 and JV2 with the count value of the interrupt counter CI, and determines whether a failure occurs during execution of each of the initialization program and the off-task program.

Figure 16:
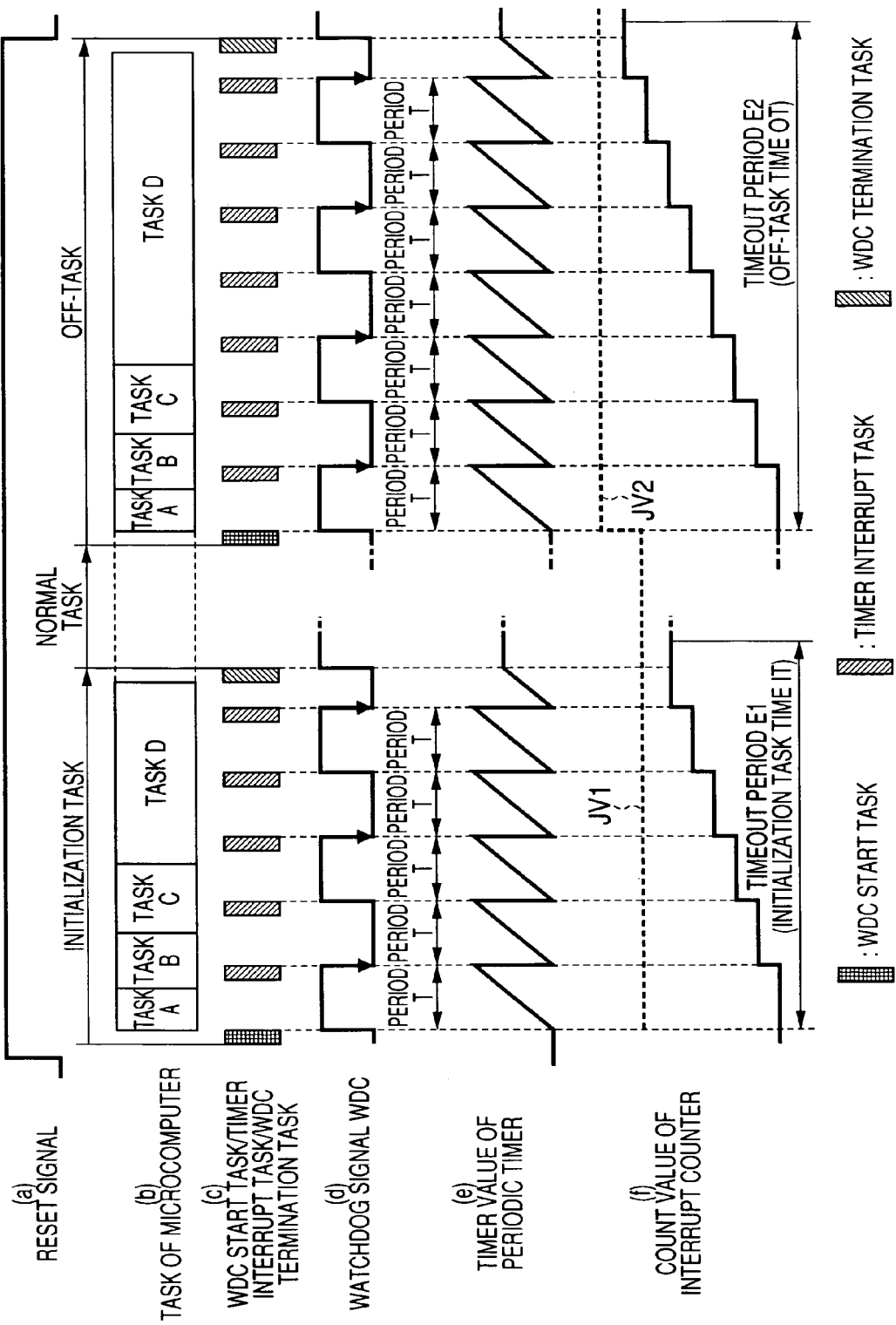
FIG. 16 is a timing chart schematically illustrating an embodiment of a watchdog signal reversing processing executed by the microcomputer and that of a malfunction monitoring processing executed by the watchdog IC according to the second embodiment.

FIG. 16 illustrates an embodiment of the watchdog signal reversing processing executed by the microcomputer 1 and that of the malfunction monitoring processing executed by the watchdog IC 2 according to the second embodiment. Note that, in FIG. 16, the second determination value JV2 is longer than the first determination value JV1.

Malfunction monitoring method according to the second embodiment, which is basically equivalent to that according to the first embodiment, will be described in detail hereinafter.

As illustrated by (a) of FIG. 16, in the microcomputer 1, when the reset signal is set to the logical high level in response to power up of the microcomputer 1, execution of the initialization program is started (see (b) of FIG. 16).

Specifically, as illustrated in FIG. 14, upon start of the initialization program, the first WDC start task is executed (see (c) of FIG. 16).

The execution of the first WDC start task determines the first determination value JV1 based on the initialization program execution time (see (f) of FIG. 16). The first determination value JV1 serves as a determination value for determining whether a failure occurs during execution of the initialization program.

In addition, the execution of the first WDC start task reverses the logical level of the watchdog signal WDC from the low level to the high level (see (d) of FIG. 16), and activates the periodic timer TP (see (e) of FIG. 16). This permits the periodic timer TP to periodically generate, to the program execution unit 10, an interrupt every reverse period T.

Thereafter, as illustrated by (b) of FIG. 16, the tasks A1 to D1 are sequentially executed by the program execution unit 10, and parallely the timer interrupt task is executed by the timer interrupt task module 13 in response to every generation of the interrupt by the periodic timer TP (see FIG. 4).

As a result, as illustrated by (d) of FIG. 16, the watchdog signal WDC whose logical level is reversed every reverse period T is output from the microcomputer 1 to the watchdog IC 2.

In addition, as illustrated by (f) of FIG. 16, the count value of the interrupt counter CI is incremented every time the timer interrupt task is executed.

If execution of the initialization program has been normally completed, as illustrated by (c) of FIG. 16, in the microcomputer 1, the first WDC termination task is executed after completion of the task D1 (see FIG. 5). Completion of execution of the first WDC termination task will cause the periodic timer TP to stop generation of an interrupt (see step S162 of FIG. 5 and (e) of FIG. 16). This results in that the increment of the count value of the interrupt counter CI is stopped.

If a failure occurs in the microcomputer 1 during execution of the initialization program, the count value of the interrupt counter CI is continuously incremented depending on the continuous timer interrupt tasks. This exceeds the first determination value JV1, which allows the microcomputer 1 to enter into the infinite loop. This results in that the microcomputer 1 is in standby, waiting for the reset signal to be output from the watchdog IC 2 (see steps S22, S24, and S25 in FIG. 4). Accordingly, input of the reset signal with the low level to the microcomputer 1 allows the microcomputer 1 to be reset, so that the initialization program is rerun by the microcomputer 1.

Subsequent to completion of the initialization program, the normal task programs are executed by the program execution unit 10 of the microcomputer 1. Execution of each of the normal task programs is monitored by the watchdog IC 2 using at least one of heretofore known malfunction monitoring processes like the first embodiment.

As illustrated by (b) of FIG. 16, in the microcomputer 1, upon power-down of the microcomputer 1, execution of the off-task program is started.

Specifically, as illustrated in FIG. 15, upon start of the off-task program, the second WDC start task is executed (see (c) of FIG. 16).

The execution of the second WDC start task determines the second determination value JV2 based on the off-task program execution time (see (f) of FIG. 16). The second determination value JV2 serves as a determination value for determining whether a failure occurs during execution of the off-task program. Specifically, at the start of the execution of the second WDC start task, the first determination value JV1 is updated to the second determination value JV2.

In addition, the execution of the second WDC start task reverses the logical level of the watchdog signal WDC from the low level to the high level (see (d) of FIG. 16), and activates the periodic timer TP (see (e) of FIG. 16). This permits the periodic timer TP to periodically generate, to the program execution unit 10, an interrupt every reverse period T.

Thereafter, as illustrated by (b) of FIG. 16, the tasks A2 to D2 are sequentially executed by the program execution unit 10, and parallely the timer interrupt task is executed by the timer interrupt task module 13 in response to every generation of the interrupt by the periodic timer TP (see FIG. 4).

As a result, as illustrated by (d) of FIG. 16, the watchdog signal WDC whose logical level is reversed every reverse period T is output from the microcomputer 1 to the watchdog IC 2.

In addition, as illustrated by (f) of FIG. 16, the count value of the interrupt counter CI is incremented every time the timer interrupt task is executed.

If execution of the initialization program has been normally completed, as illustrated by (c) of FIG. 16, in the microcomputer 1, the second WDC termination task is executed after completion of the task D2 (see FIG. 5). Completion of execution of the second WDC termination task will cause the periodic timer TP to stop generation of an interrupt (see step S162 of FIG. 5 and (e) of FIG. 16). This results in that the increment of the count value of the interrupt counter CI is stopped.

If a failure occurs in the microcomputer I during execution of the off-task program, the count value of the interrupt counter CI is continuously incremented depending on the continuous timer interrupt tasks. This exceeds the second determination value JV2, which allows the microcomputer 1 to enter into the infinite loop. This results in that the microcomputer 1 is in standby, waiting for the reset signal to be output from the watchdog IC 2 (see steps S22, S24, and S25 in FIG. 4). Accordingly, input of the reset signal with the low level to the microcomputer 1 allows the microcomputer 1 to be reset, so that the initialization program is rerun by the microcomputer 1.

As described above, in the malfunction monitoring method and system according to the second embodiment, the following new effects can be obtained in addition to the effects described in the first embodiment.

Specifically, in the second embodiment, the first and second determination values JV1 and JV2 are individually determined for the respective initialization program and the off-task program; these first and second determination values JV1 and JV2 are required to determine whether a failure occurs during execution of the initialization program and the off-task program. The first and second determination values JV1 and JV2 can be therefore individually set, for the initialization program and the off-task program, flexibly to adapt the lengths of the corresponding program execution times and/or the changes in the algorithms of the corresponding programs.

Even if any one of the first and second determination values JV1 and JV2 need be reset depending on the change in the algorithm of the corresponding program, it is only necessary to reset any one of the first and second determination values JV1 and JV2. For example, even if the first determination value JV1 need be reset depending on the change in the algorithm of the initialization program, it is only necessary to reset the first determination value JV1 depending on the change in the algorithm of the initialization program.

This makes it possible to further improve the maintainability of each of the initialization program and the off-task program.

Especially, the initialization program is a program to be executed prior to the remaining programs. If a failure occurs in the microcomputer 1 during execution of the initialization program, the failure would contribute to execution of the normal task programs. If a failure occurs during execution of the initialization program, the microcomputer 1 therefore need be earlier reset. Thus, set of the initialization task time IT short allows the microcomputer 1 to be early reset even if a failure occurs during execution of the initialization program.

In contrast, the off-task program is a program to be executed after completion of the initialization program, and therefore, even though a failure occurs during execution of the off-task program, the impact of the failure is limited. In addition, because the operation of the ECU 100 including the malfunction monitoring system is stable during execution of the off-task program, even through a failure occurs during execution of the off-task program, the urgency of resetting the microcomputer 1 is not so high. In this case, a long off-task time OT permits a period between the occurrence of the failure in the microcomputer 1 during execution of the off-task program and the reset of the microcomputer 1 to be long. This makes it possible for the program execution unit 10 to execute fail-safe tasks and/or tasks for storing various settings within the period.

Third Embodiment

A third embodiment of the present invention will be described hereinafter with reference to FIGS. 1, 15, 17, and 18. Note that the hardware structure of the malfunction monitoring system according to the third embodiment will be substantially identical with that of the malfunction monitoring system MS according to the first embodiment.

The malfunction monitoring system according to the third embodiment is configured to change the determination value based on an execution time of a task that is presumed upon execution of the task.

For example, in the third embodiment, the task C2 in the off-task program causes the program execution unit 10 to write a failure code(s) into the second memory M2 if a failure occurs during execution of the normal task programs for controlling the in-vehicle devices. The failure code(s) is designed to identify the occurrence of the failure.

Next, the task C2 to be executed by the program execution unit 10 in accordance with the off-task program will be described with reference to the flowchart illustrated in FIG. 17.

Figure 17:
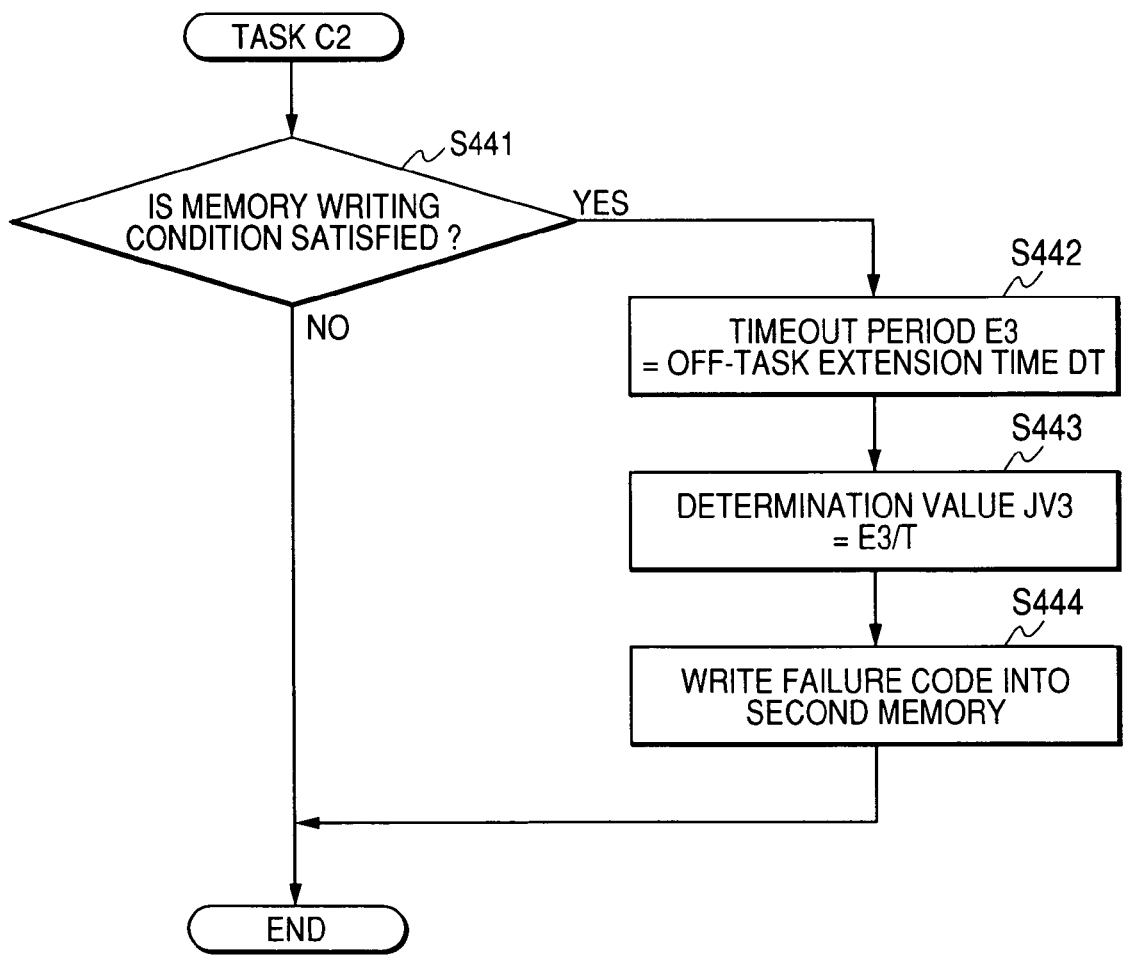
FIG. 17 is a flowchart schematically illustrating a task C2 included in the off-task of the program execution unit according to the second embodiment.

As illustrated in FIG. 17, upon start of the task C2, the program execution unit 10 determines whether a failure occurs during execution of the normal task programs, in other words, whether a memory writing condition is satisfied in step S441. If it is determined that the memory writing condition is unsatisfied (the determination in step S441 is NO), the program execution unit 10 exits the task C2.

Otherwise if it is determined that the memory writing condition is satisfied (the determination in step S441 is YES), the program execution unit 10 calculates a timeout period E3 using an off-task extension task time DT slightly longer than an execution time of the task C2 in step S442. The execution time of the task C2 includes a working time presumed to be required to write the failure code into the second memory M2.

Next, the program execution unit 10 determines the determination value JV3 based on the timeout period E3 and the reverse period T in step S443. For example, in step S443, the program execution unit 10 determines the determination value JV3 in accordance with the following equation:

$$JV3 = E3/T$$

Specifically, in the third embodiment, if a failure occurs during execution of the normal task programs in the microcomputer 1, the second determination value JV2 is updated to the determination value JV3 through the task C2 of the program execution unit 10.

Subsequently, the program execution unit 10 writes the failure code into the second memory M2 in step S444, exiting the task C2.

Like the first and second embodiments, the program execution unit 10 according to the third embodiment executes the watchdog signal reversing processing parallely with execution of the initialization task program and the off-task program, and monitors whether a failure occurs during execution of each of the programs, which is substantially identical to the second embodiment.

In the third embodiment, descriptions of an embodiment of the watchdog signal reversing processing and that of the failure monitoring processing executed by the program execution unit 10 are omitted because they have been described in the first and second embodiments. In the third embodiment, change of the second determination value JV2 to the determination value JV3 will be described hereinafter with reference to the timing chart illustrated in FIG. 18.

Figure 18:
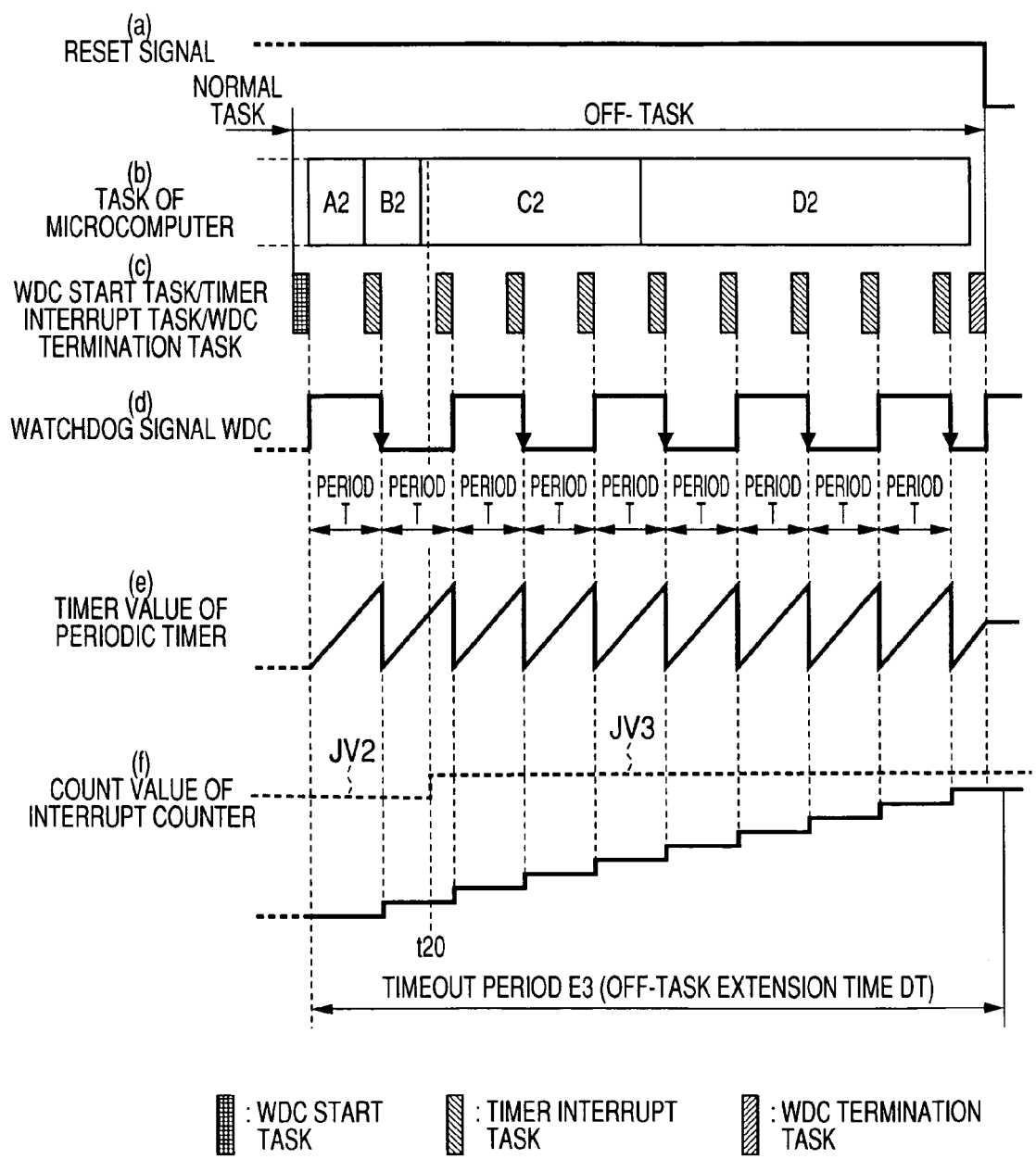
FIG. 18 is a timing chart schematically illustrating an embodiment of the watchdog signal reversing processing executed by the microcomputer and that of the malfunction monitoring processing executed by the watchdog IC according to a third embodiment of the present invention.

As illustrated by (f) of FIG. 18, even if a failure has occurred during execution of the normal task programs, when the second WDC start task (see FIG. 15) is executed by the WDC start module 11 upon start of the off-task program, the second determination value JV2 is set for determination of whether a failure occurs during execution of the off-task program.

If a failure has occurred during execution of the normal task programs, however, the memory writing condition is satisfied at a timing t20 upon execution of the task C2 (see step S441 of FIG. 17). This allows the determination value JV3 determined based on the off-task extension task time DT to be set at the timing t20 (see steps S442 and 443 of FIG. 17 and (f) of FIG. 14). The determination value JV3 is larger than the second determination value JV2 and serves as a determination value for determining whether a failure occurs during execution of the off-task program. Specifically, after the timing t20, the program execution unit 10 determines whether a failure occurs during execution of the off-task program by comparing the determination value JV3 with the count value of the interrupt counter CI.

Note that the condition for changing the second determination value JV2 to the determination value JV3 and/or the descriptions of the task to be executed when the condition is satisfied can be arbitrarily determined. The determination value JV3 can be set to be smaller than the second determination value JV2. For example, if the task C2 partially includes a task that will be made redundant upon establishment of the condition, the timeout period E3 can be determined based on the execution time of the task C2 except for the redundant task. When the condition is satisfied, the determination value JV3 can be determined based on the timeout period E3. The number of conditions for changing a determination value and/or the number of determination values that will be changed upon establishment of the condition(s) can be arbitrarily set.

As described above, in the malfunction monitoring method and system according to the third embodiment, the following new effects can be obtained in addition to the effects described in the first and second embodiments.

Specifically, in the third embodiment, if a failure occurs during execution of the normal task programs, the determination value JV3 is determined based on the off-task program execution time including a time required to write the failure code into the second memory M2 during execution of the task C2. Thereafter, the program execution unit 10 determines whether a failure occurs during execution of the off-task program by comparing the determination value JV3 with the count value of the interrupt counter CI.

Even through the execution time of the task C2 varies depending on the result of execution of the normal task programs, change of the determination value allows the variation of the execution time to be soothed out, making it possible to appropriately monitor a malfunction in the microcomputer 1.

Fourth Embodiment

A fourth embodiment of the present invention will be described hereinafter with reference to FIGS. 1 and 19 to 24. Note that the hardware structure of the malfunction monitoring system according to the third embodiment will be substantially identical with that of the malfunction monitoring system MS according to the first embodiment.

The malfunction monitoring system according to the fourth embodiment is configured to change the interrupt period (reverse period) during execution of the initialization program and/or the off-task program.

Next, the sequential-processing tasks to be executed by the program execution unit 10 in accordance with, for example, the initialization program will be described hereinafter with reference to the flowcharts illustrated in FIGS. 19 to 22.

Figure 19:
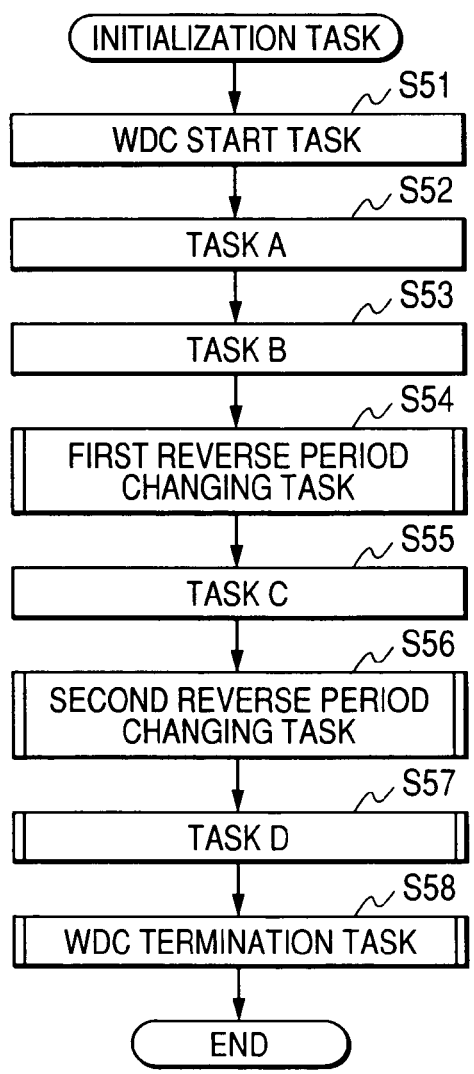
FIG. 19 is a flowchart schematically illustrating an initialization task of the program execution unit according to a fourth embodiment of the present invention.

As illustrated in FIG. 19, in the program execution unit 10, upon start of the initialization program, the WDC start module 11 (see FIG. 1) executes a WDC start task in step S51.

Thereafter, the program execution unit 10 serially runs the tasks A and B in this order (steps S52 and S53).

After completion of the execution of the serial tasks A and B, the program execution unit 10 executes a first reverse period changing task in step S54. The first reverse period changing task serves as a task to change the interrupt period.

Thereafter, the program execution unit 10 executes the task C in step S55, and thereafter, executes a second reverse period changing task in step S56. The second reverse period changing task also serves as a task to change the interrupt period.

After completion of the second reverse period changing task, the WDC termination module 12 of the program execution unit 10 executes the WDC termination task (see FIG. 5) in step S58.

Next, the WDC start task to be executed by the WDC start module 11 of the program execution unit 10 according to the fourth embodiment will be described hereinafter with reference to the flowchart illustrated in FIG. 20.

Figure 20:
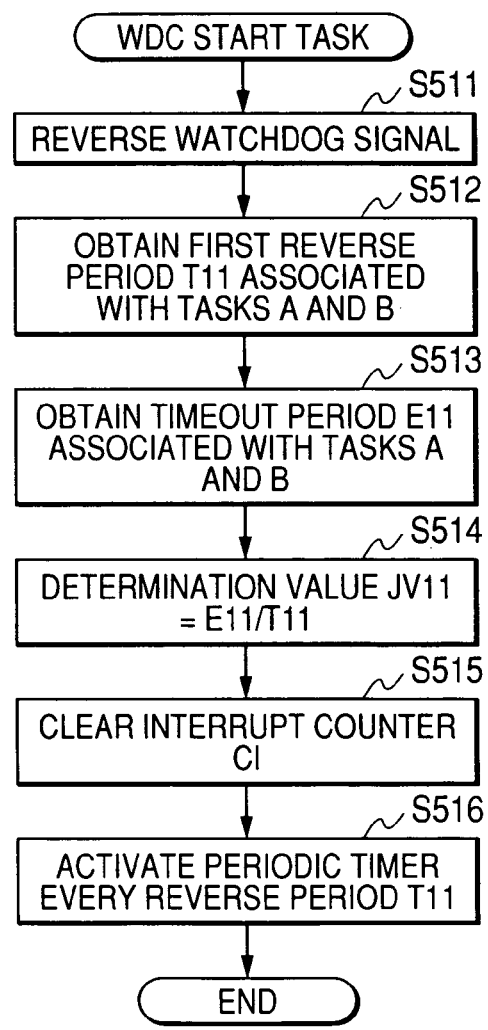
FIG. 20 is a flowchart schematically illustrating a WDC start task included in the initialization task of the program execution unit according to the fourth embodiment.

Specifically, the WDC start module 11 reverses the logical level of the watchdog signal WDC in step S511 of FIG. 20.

Next, the WDC start module 11 obtains a first reverse period T11 based on a reverse period previously assigned to the tasks A and B in step S512.

The WDC start module 11 obtains a timeout period E11 based on an estimated task time slightly longer than the total execution time of the tasks A and B in step S513.

In the next step S514, the WDC start module 11 calculates a determination value JV11 based on the timeout period E11 and the first reverse period T11 in accordance with the following equation:

$$JV11 = E11/T11$$

The WDC start module 11 stores the determination value JV11 in the determination storing module 14 in step S514.

Next, the WDC start module 11 clears the interrupt counter CI in step S515, and thereafter, activates the periodic timer TP (see FIG. 1) in the first reverse period T11 as the interrupt period in step S516. This allows interrupts to be generated every reverse period T11, so that the interrupts are input to the program execution unit 10.

Next, the first reverse period changing task to be executed by the program execution unit 10 according to the fourth embodiment will be described hereinafter with reference to the flowchart illustrated in FIG. 21.

Specifically, the program execution unit 10 reverses the logical level of the watchdog signal WDC in step S541 of FIG. 21.

Next, the program execution unit 10 stops the operation of the periodic timer TP in step S542.

Subsequently, the program execution unit 10 obtains a second reverse period T12 based on a reverse period previously assigned to the task C in step S543.

The program execution unit 10 obtains a timeout period E12 based on an estimated task time slightly longer than the execution time of the task C in step S544.

In the next step S545, the program execution unit 10 calculates a determination value JV12 based on the timeout period E12 and the second reverse period T12 in accordance with the following equation:

$$JV12 = E12/T12$$

The program execution unit 10 stores the determination value JV12 in the determination storing module 14 in step S545.

Next, the program execution unit 10 clears the interrupt counter CI in step S546, and thereafter, activates the periodic timer TP (see FIG. 1) in the second reverse period T12 as the interrupt period in step S547. This allows interrupts to be generated every reverse period T12, so that the interrupts are input to the program execution unit 10.

Next, the second reverse period changing task to be executed by the program execution unit 10 according to the fourth embodiment will be described hereinafter with reference to the flowchart illustrated in FIG. 22.

Specifically, the program execution unit 10 reverses the logical level of the watchdog signal WDC in step S561 of FIG. 22.

Next, the program execution unit 10 stops the operation of the periodic timer TP in step S562.

Subsequently, the program execution unit 10 obtains a third reverse period T13 based on a reverse period previously assigned to the task D in step S563.

The program execution unit 10 obtains a timeout period E13 based on an estimated task time slightly longer than the execution time of the task D in step S564.

In the next step S565, the program execution unit 10 calculates a determination value JV13 based on the timeout period E13 and the second reverse period T13 in accordance with the following equation;

$$JV13 = E13/T13$$

The program execution unit 10 stores the determination value JV13 in the determination storing module 14 in step S565.

Next, the program execution unit 10 clears the interrupt counter CI in step S566, and thereafter, activates the periodic timer TP (see FIG. 1) in the third reverse period T13 as the interrupt period in step S567. This allows interrupts to be generated every reverse period T13, so that the interrupts are input to the program execution unit 10.

FIG. 23 illustrates an embodiment of the watchdog signal reversing processing executed by the microcomputer 1 according to the fourth embodiment and that of the malfunction monitoring processing executed by the watchdog IC 2. FIG. 24 illustrates another embodiment of the watchdog signal reversing processing executed by the microcomputer 1 according to the fourth embodiment and that of the malfunction monitoring processing executed by the watchdog IC 2.

Malfunction monitoring method according to the fourth embodiment will be described in detail hereinafter.

First, the embodiment of the watchdog signal reversing processing executed by the microcomputer 1 and that of the malfunction monitoring processing executed by the watchdog IC 2 when execution of the initialization program has been normally completed will be described with reference to the timing chart of FIG. 23.

As illustrated by (a) of FIG. 23, in the microcomputer 1, when the reset signal is set to the high level in response to power up of the microcomputer 1, execution of the initialization program is started (see (b) of FIG. 23.

Specifically, as illustrated in FIGS. 19 and 20, upon start of the initialization program, the WDC start task is executed (see (c) of FIG. 23). The execution of the WDC start task reverses the logical level of the watchdog signal WDC from the low level to the high level (see (d) of FIG. 23), and activates the periodic timer TP (see (e) of FIG. 23). This permits the periodic timer TP to periodically generate, to the program execution unit 10, an interrupt every first reverse period T11.

As illustrated by (c) of FIG. 23, the timer interrupt tasks are therefore executed by the timer interrupt module 13 every first reverse period T11 (see FIG. 4).

As a result, as illustrated by (d) of FIG. 23, the watchdog signal WDC whose logical level is reversed every first reverse period T11 is output from the microcomputer 1 to the watchdog IC 2.

Execution of the WDC start task allows the determination value JV11 to be set (see (f) of FIG. 23); this determination value JV11 is used for determining whether a failure occurs during execution of each of the tasks A and B. In addition, as illustrated by (f) of FIG. 23, every time the timer interrupt task is executed, the count value of the interrupt counter CI is incremented.

In the microcomputer 1, after the tasks A and B have been sequentially executed, the first reverse period changing task is run (see FIG. 21), so that the interrupt period is changed from the first reverse period T11 to the second reverse period T12.

As a result, as illustrated by (d) of FIG. 23, the watchdog signal WDC whose logical level is reversed every second reverse period T12 is output from the microcomputer 1 to the watchdog IC 2. The execution of the first reverse period changing task allows the determination value JV11 to be changed to the determination value JV12 (see (f) of FIG. 23). In this case, as illustrated by (f) of FIG. 23, every time the timer interrupt task is executed, the count value of the interrupt counter CI is incremented. Note that, because the interrupt period is changed from the first reverse period T11 to the second reverse period T12, the time intervals between the adjacent increments are changed in correspondence with the second reverse period T12.

In the microcomputer 1, after the task C has been executed, the second reverse period changing task is run (see FIG. 22 and (b) of FIG. 23), so that the interrupt period is changed from the second reverse period T12 to the third reverse period T13. This results in that, as illustrated by (d) of FIG. 23, the watchdog signal WDC whose logical level is reversed every third reverse period T13 is output from the microcomputer 1 to the watchdog IC 2.

As described above, the watchdog signal WDC whose logical level is reversed every first reverse period T11 is output from the microcomputer 1 to the watchdog IC 2 during execution of the tasks A and B. In addition, the watchdog signal WDC whose logical level is reversed every second reverse period T12 is output from the microcomputer 1 to the watchdog IC 2 during execution of the task C. Moreover, the watchdog signal WDC whose logical level is reversed every third reverse period T13 is output from the microcomputer 1 to the watchdog IC 2 during execution of the task D.

Specifically, the reverse periods T11, T12, and T13 of the watchdog signal WDC correspond to the tasks A and B, the task C, and the task D, respectively.

Execution of the second reverse period changing task allows the determination value JV12 to be changed to the determination value JV13 (see (f) of FIG. 23). In this case, as illustrated by (f) of FIG. 23, every time the timer interrupt task is executed, the count value of the interrupt counter CI is incremented. Note that, because the interrupt period is changed from the second reverse period T12 to the third reverse period T13, the time intervals between the adjacent increments are changed in correspondence with the third reverse period T13.

If execution of the initialization program has been normally completed, as illustrated by (c) of FIG. 23, in the microcomputer 1, the WDC termination task is executed after completion of the task D (see FIG. 5). Completion of execution of the WDC termination task will cause the periodic timer TP to stop generation of an interrupt (see step S162 of FIG. 5 and (e) of FIG. 23). This results in that the increment of the count value of the interrupt counter CI is stopped.

Next, another embodiment of the watchdog signal reversing processing executed by the microcomputer 1 and that of the malfunction monitoring processing executed by the watchdog IC 2 if it is determined that the microcomputer 1 is presumed to be malfunctioning, such as the initialization program is interrupted or hung, will be described with reference to the timing chart of FIG. 24. Note that, in the fourth embodiment, a failure occurs in the microcomputer 1 during execution of the task C of the initialization program as an example.

As described above, when the first reverse period changing tasks is executed upon execution of the initialization program, as illustrated by (d) of FIG. 24, the watchdog signal whose logical level is reversed every second reverse period T12 is output to the watchdog IC 2. At that time, as a determination value for determining whether a failure occurs during execution of the task C, the determination value JV12 is set.

If a failure occurs during execution of the task C, because no second reverse period changing tasks is executed after the occurrence of the failure, the watchdog signal WDC whose logical level is reversed every second reverse period is continuously output to the watchdog IC 2. Measurement of the reverse period in the watchdog signal WDC allows an occurrence of a failure in the microcomputer 1 to be identified.

As illustrated by (f) of FIG. 24, if the count value of the interrupt counter CI exceeds the determination value JV12, the microcomputer 1 enters into the infinite loop. This results in that the microcomputer 1 is in standby, waiting for the reset signal to be output from the watchdog IC 2 (see steps S22, S24, and S25 in FIG. 4). When the logical level of the reset signal is reversed from the high level to the low level to be input to the microcomputer 1, the microcomputer 1 is reset.

As described above, in the malfunction monitoring method and system according to the fourth embodiment, the following new effects can be obtained in addition to the effects described in the first to third embodiments.

Specifically, upon each of the tasks constituting the initialization program, the interrupt period, in other words, the reverse period of the watchdog signal is changed. By measuring the reverse period or the interrupt period of the watchdog signal WDC, it is possible to identify or focus location of failure.

Malfunction monitoring methods and system according to the present invention are not limited to the structures described in the first to fourth embodiments.

For example, in each of the first to fourth embodiments, the periodic timer TP is configured to periodically generate an interrupt, but, in the present invention, various methods of periodically generating an interrupt can be used. For example, a timer overflow interrupt can be used to periodically generate an interrupt. The timer overflow interrupt will be described hereinafter with reference to FIGS. 25 and 26.

Figure 25:
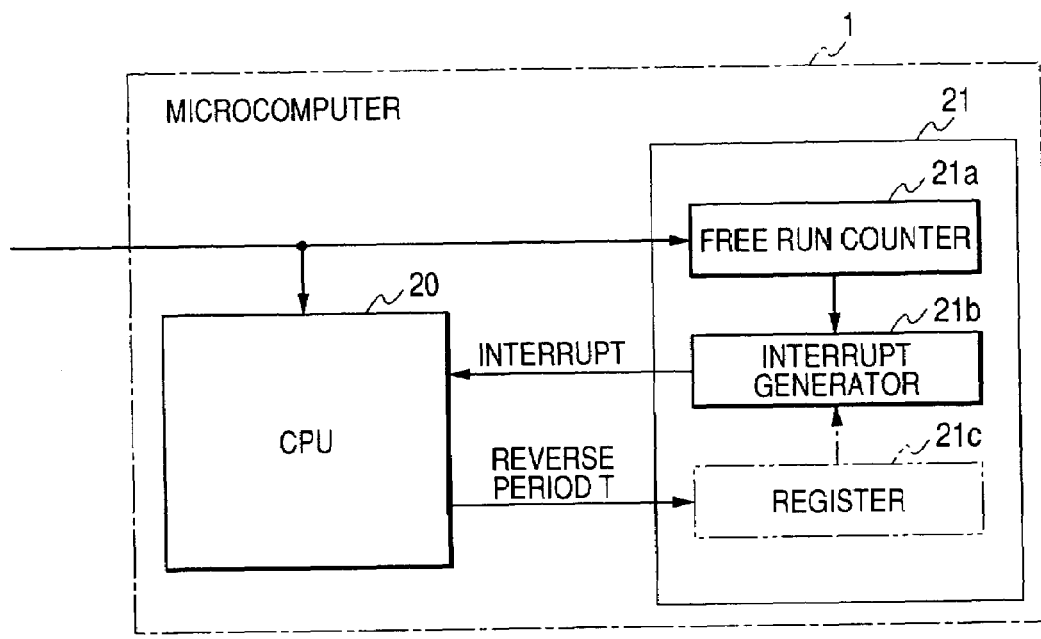
FIG. 25 is a block diagram schematically illustrating an example of a structure required to periodically generate an interrupt in an inner structure of the microcomputer according to a modification of the present invention.

FIG. 25 illustrates an example of a structure required to periodically generate an interrupt in the inner structure of the microcomputer 1.

As illustrated in FIG. 25, the microcomputer 1 includes a CPU (Central Processing Unit) 20 and a timer unit 21 as the structure required to periodically generate an interrupt. A common clock signal consisting of a repetitive series of clock pulses is input to the CPU 20 and the timer unit 21. The CPU 20 serves as the program execution unit 10. The timer unit 21 is, for example, included within the same chip as the CPU 20, but the timer unit 21 can be integrated on/in a chip external to the CPU 20.

The timer unit 21 is composed of a free run counter 21a and an interrupt generator 21b. The free run counter 21a consists of a two-byte counter whose maximum capacity is 2 bytes, and is configured to count the trailing edges of the clock pulses. The interrupt generator 21b is configured to output an interrupt to the CPU 20 when a counter overflow occurs. How to generate an interrupt by the free run counter 21a and the interrupt generator 21b will be described hereinafter with reference to a tiring chart illustrated in FIG. 26

Figure 26:
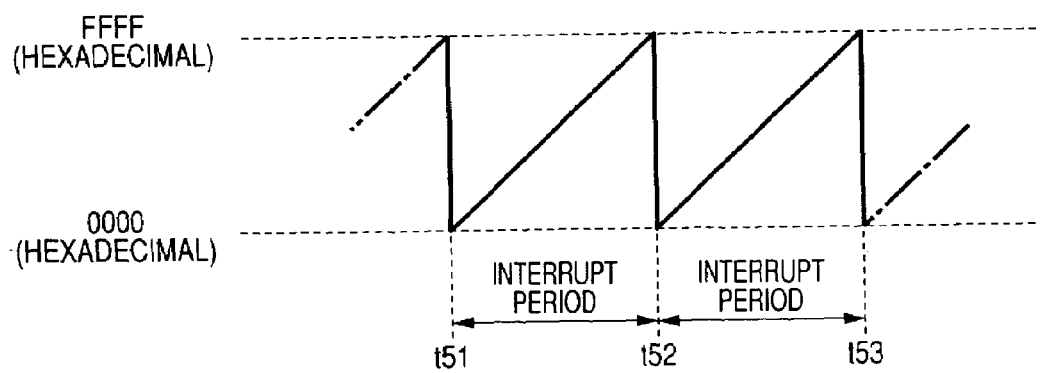
FIG. 26 is a timing chart schematically illustrating how to generate an interrupt by a free run counter and an interrupt generator illustrated in FIG. 25 according to the modification of the present invention.

As illustrated by the timings t51, t52, and t53 in FIG. 26, when the count value of the free run counter 21a exceeds FFFF in hexadecimal, the counter overflow occurs so that the count value is reset to 0000 in hexadecimal. The counter overflow causes the interrupt generator 21b to generate an interrupt to the CPU 20. This allows an interrupt to be input to each of the timings t51, t52, and t53. Because the counter overflow periodically occurs, an interrupt is periodically generated to be input to the CPU 20.

In this modification, it is possible to periodically generate an interrupt based on an overflow of the free run counter 21a, in other words, a timer overflow interrupt, which allows the hardware resources of the microcomputer 1 to be saved.

This effect of saving the hardware resources will be described in detail hereinafter while other methods of periodically generating an interrupt will be supplementarily described hereinafter. For example, compare match interrupt and pulse width modulation periodic interrupt will be described as examples of the other methods.

Figure 27:
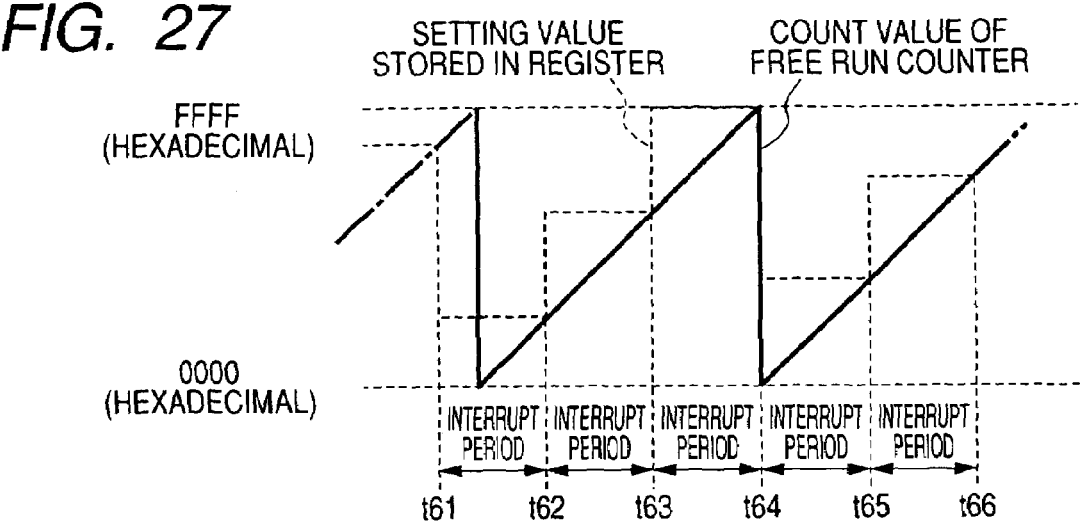
FIG. 27 is a timing chart schematically illustrating compare match interrupt for periodically generating an interrupt according to another modification of the present invention.

An example of generation of periodic interrupts based on compare match interrupt will be described hereinafter with reference to a timing chart illustrated in FIG. 27.

In order to periodically generate an interrupt based on the compare match interrupt, the timer unit 21 is composed of a register (compare register) 21c illustrated by the two-dot chain line in FIG. 25. In the register 21c, as an interrupt period instructed by the CPU 20, a count value corresponding to the instructed interrupt period has been stored as a setting value; this count value (setting value) also corresponds to the timer value PE of the periodic timer TP.

The interrupt generator 21b is configured to compare the count value of the free run counter 21a with the setting value stored in the register 21c, and output an interrupt to the CPU 20 every time the count value of the free run counter 21a matches the setting value stored in the register 21c. Specifically, the interrupt generator 21b is configured to output an interrupt to the CPU 20 at each of the timings t61 to t66 at which the count value of the free run counter 21a coincides with the setting value stored in the register 21c.

After output of an interrupt, the interrupt generator 21b is configured to increment the setting value stored in the register 21c by a predetermined value corresponding to the setting value, and to store the incremented setting value as a setting value in the register 21c. This allows the setting value stored in the register 21c to be periodically changed by the predetermined value corresponding to the setting value, which causes the interrupt generator 21b to periodically output an interrupt to the CPU 20.

As described above, the compare match interrupt allows the timer unit 21 to periodically generate an interrupt to the CPU 20. The compare match interrupt however requires the register 21c. In contrast, the overflow interrupt as set forth above can periodically generate an interrupt without using a register, making it possible to save the hardware resources of the microcomputer 1.

An example of generation of periodic interrupts based on pulse width modulation (PWM) periodic interrupt will be described hereinafter with reference to a timing chart illustrated in FIG. 28.

In order to periodically generate an interrupt based on the PWM periodic interrupt, the timer unit 21 is composed of a register 21c illustrated by the two-dot chain line in FIG. 25. The register 21c consists of a periodic register and a Duty register. In the periodic register, as an interrupt period instructed by the CPU 20, a count value corresponding to the instructed interrupt period has been stored as a setting value; this count value (setting value) also corresponds to the timer value PE of the periodic timer TP.

In the Duty register, a duty cycle is set; this duty cycle is used for duty control. In this modification, when the setting value stored in the register is 2000 in hexadecimal, and the duty cycle of the Duty register is set to 60%, periodic generation of an interrupt will be described with reference to FIG. 28.

Figure 28:
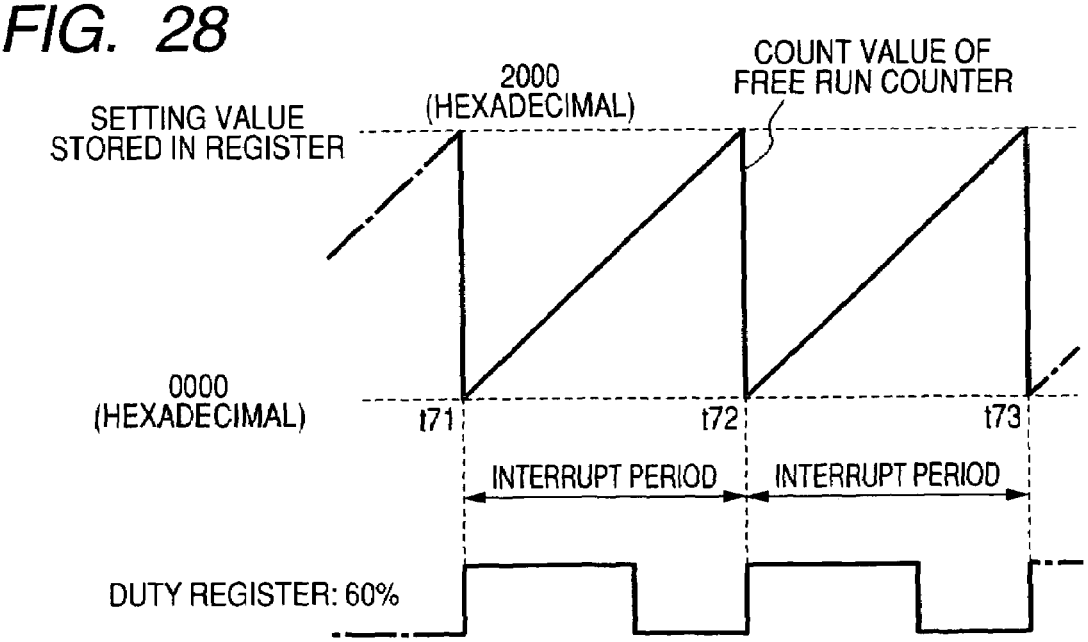
FIG. 28 is a timing chart schematically illustrating pulse width modulation periodic interrupt for periodically generating an interrupt according to a further modification of the present invention.
Figure 29:
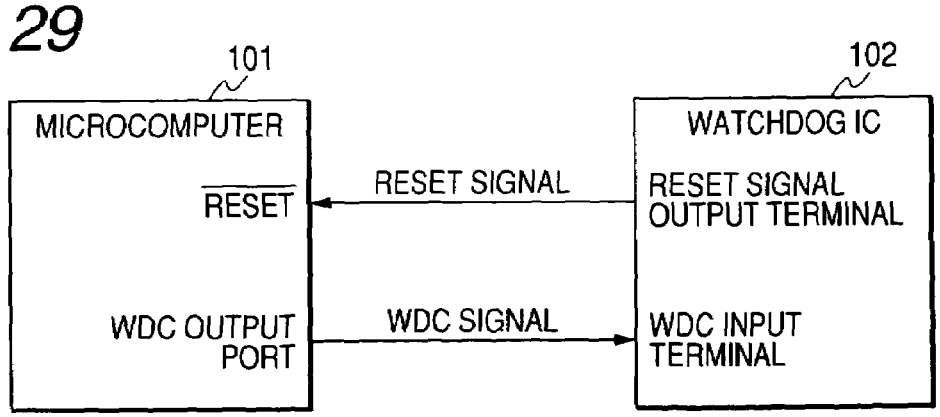
FIG. 29 is a block diagram schematically illustrating an example of the configuration of a conventional malfunction monitoring system.

As illustrated in FIG. 28, the interrupt generator 21b is configured to execute the duty control based on the setting value as the PWM period using the free run counter 21a. The interrupt generator 21b is configured to output an interrupt to the CPU 20 every time the count value of the free run counter 21a matches the setting value stored in the register 21c. Specifically, the interrupt generator 21b is configured to output an interrupt to the CPU 20 at each of the timings t71 to t73 at which the count value of the free run counter 21a coincides with the setting value stored in the register 21c.

This allows an interrupt to be periodically generated to be input to the CPU 20.

As described above, the PWM periodic interrupt allows the timer unit 21 to periodically generate an interrupt to the CPU 20. The PWM periodic interrupt however requires the periodic register. In contrast, the overflow interrupt as set forth above can periodically generate an interrupt without using a register, making it possible to save the hardware resources of the microcomputer 1.

Especially, because the PWM periodic interrupt requires both the periodic register and the Duty register, the overflow interrupt as set forth above has a great advantage in saving the hardware resources of the microcomputer 1. One of various periodic interrupt generation methods can be used for the microcomputer 1 (ECU 100) depending on usage environment.

The target of the malfunction monitoring methods and systems according to the present invention is not limited to the microcomputer that is executing the initialization program and off-task program. Specifically, the malfunction monitoring methods and systems according to the present invention can monitor a processing unit, such as CPU or an arithmetic processor, during execution of various programs each including a plurality of tasks preferably sequentially executable by the processing unit.

Moreover, in each of the first to fourth embodiments and their modifications, the ECU is installed in a vehicle, but a control unit functionally equivalent to the ECU can be installed in other types of machines.

In each of the first to fourth embodiments and their modifications, the watchdog signal WDC is reversed in response to each of the interrupts generated by the periodic timer TP, but the present invention is not limited to the configuration. Specifically, the watchdog signal WDC can be changed in response to each of the interrupts generated by the periodic timer TP. For example, the watchdog signal WDC can be changed in its feature, such as amplitude, frequency, and/or phase, in response to each of the interrupts generated by the periodic timer TP.

In each of the first to fourth embodiments and their modifications, the determination storing module 14 is operatively provided in the program execution unit 10, but the present invention is not limited to the structure. Specifically, either the first memory M1 or the second memory M2 can serve as the determination storing module 14.

In each of the first to fourth embodiments and their modifications, the monitoring control unit 15 is installed in the microcomputer 1, but the present invention is not limited to the structure. Specifically, at least the periodic timer TP and the interrupt counter CI can be separated from the microcomputer 1.

More specifically, the WDC start module 11, the WDC termination module 12, the timer interrupt module 13, and the determination storing module 14 can also be separated from the program execution unit 10 and the microcomputer 1. In this case, for example, when executing the WDC start task in step S11 of FIG. 2A upon start of the initialization program, the program execution unit 10 can instruct the WDC start module 11 to execute the WDC start task in step S11 (steps S111 to S114 of FIG. 3).

Similarly, the program execution unit 10 can instruct the timer interrupt module 13 to execute the timer interrupt task (see steps S21 to S25 of FIG. 4) every time the interrupt is generated by the periodic timer TP.

Furthermore, the program execution unit 10 can instruct the WDC termination module 12 to execute the WDC termination task (see steps S161 and S162 of FIG. 4) after completion of the execution of the serial tasks A to D.

In addition, those skilled in the art will appreciate that the present invention is capable of being distributed as program products, for example, the programs stored in the second memory unit M2 in a variety of forms. It is also important to note that the present invention applies equally regardless of the particular type of signal bearing media used to actually carry out the distribution. Examples of suitable signal bearing media include recordable type media such as CD-ROMs and DVD-ROMs, and transmission type media such as digital and analog communications links.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A method of monitoring a watchdog signal output from a processing unit during execution of a program and of determining that the processing unit is presumed to be malfunctioning, upon lack of change in the monitored watchdog signal within a predetermined timeout period, the method comprising:

generating an interrupt to the processing unit every predetermined period, the predetermined period being shorter than the predetermined timeout period, the watchdog signal being changed in response to each of the generated interrupts; and disabling the interrupt generation, upon the last interrupt being generated over an estimated time when the execution of the program is estimated to be completed.

2. A method according to claim 1, wherein the disabling further includes:

setting a determination value, the determination value being obtained by dividing the estimated time by the predetermined period;

counting the number of the interrupts generated by the generating; and determining that the last interrupt is generated over the estimated time, upon the number of the interrupts generated by the generating exceeding the determination value.

3. A method according to claim 2, wherein the program is composed of a plurality of programs to be sequentially executed by the processing unit, and the setting includes setting the determination value to each of the programs based on the estimated time thereof, the estimated time corresponding to a time when the execution of each of the programs is estimated to be completed.

4. A method according to claim 2, wherein the program is composed of a plurality of programs to be sequentially executed by the processing unit, the plurality of programs are started from an initiation task, and terminated by a termination task, and the generating includes:

starting the interrupt generation every predetermined period in response to execution of the initiation task; and terminating the interrupt generation in response to execution of the termination task.

5. A method according to claim 4, further comprising:

executing, as the initiation task, the following tasks:

a first task for changing the watchdog signal;

a second task for setting the determination value based on the estimated time when the execution of the program is estimated to be completed;

a third task for clearing a count value representing the number of the interrupts; and a fourth task for activating a timer every predetermined period to count, and executing, as the termination task, the following tasks:

a fifth task for changing the watchdog signal; and a sixth task for stopping the timer.

6. A method according to claim 2, wherein the program is composed of a plurality of programs to be sequentially executed by the processing unit, further comprising:

changing the determination value based on an estimated execution time during any one of tasks being executed by the processing unit, the tasks constituting the plurality of programs, the estimated execution time being estimated as an execution time of any one of the tasks.

7. A method according to claim 2, wherein the program is composed of a plurality of programs to be sequentially executed by the processing unit, further comprising:

changing the predetermined period corresponding to any one of tasks being executed by the processing unit, the tasks constituting the plurality of programs.

8. A method according to claim 7, wherein the program is composed of a plurality of programs to be sequentially executed by the processing unit, the plurality of programs are started from an initiation task, and terminated by a termination task, further comprising:

executing, as the initiation task, the following tasks:

a first task for changing the watchdog signal;

a second task for setting the predetermined period to a first period with respect to at least one of tasks, the tasks constituting the plurality of programs, the at least one of the tasks being executed by the processing unit until the predetermined period is changed;

a third task for setting the determination value to a first determination value, the first determination value being obtained by dividing a first estimated execution time by the first predetermined period, the first estimated execution time being estimated as an execution time of the at least one of the tasks;

a fourth task for clearing a count value representing the number of the interrupts; and a fifth task for activating a timer every first predetermined period to count, and executing, as the changing of the predetermined period corresponding to any one of the tasks, the following tasks:

is a sixth task for changing the watchdog signal;

a seventh task for stopping the timer, an eighth task for setting the predetermined period with respect to any one of the tasks to a second period;

a ninth task for setting the determination value to a second determination value, the second determination value being obtained by dividing a second estimated execution time by the second predetermined period, the second estimated execution time being estimated as an execution time of the at least one of the tasks;

a tenth task for clearing a count value representing the number of the interrupts; and an eleventh task for activating the timer every second predetermined period to count.

9. A method according to claim 1, wherein the generating generates an interrupt to the processing unit every predetermined period using a free run counter and at least one of:

overflow interrupt based on overflow of the free run counter;

compare match interrupt based on a count value of the free run counter and a setting value stored in a compare register; and pulse width modulation periodic interrupt executed every time the count value of the free run counter reaches a pulse width modulation period set to a periodic register upon execution of duty control by the free run counter.

10. A method according to claim 1, wherein the program includes at least one of;

an initialization program to be executed at power-up of the processing unit; and an off-task program that causes the processing unit to execute various tasks required at power-off of the processing unit.

11. A system for monitoring a watchdog signal output from a processing unit during execution of a program and for determining that the processing unit is presumed to be malfunctioning, upon lack of change in the monitored watchdog signal within a predetermined timeout period, the system comprising:

a generating unit configured to generate an interrupt to the processing unit every predetermined period, the predetermined period being shorter than the predetermined timeout period, the watchdog signal being changed in response to each of the generated interrupts; and a disabling unit configured to disable the interrupt generation of the generating unit, upon the last interrupt being generated over an estimated time when the execution of the program is estimated to be completed.

12. A system according to claim 11, wherein the disabling unit further comprises;

a setting unit configured to set a determination value, the determination value being obtained by dividing the estimated time by the predetermined period;

a counting unit configured to count the number of the interrupts generated by the generating unit; and a determining unit configured to determine that the last interrupt is generated over the estimated time, upon the number of the interrupts generated by the generating unit exceeding the determination value.

13. A system according to claim 12, wherein the program is composed of a plurality of programs to be sequentially executed by the processing unit, and the setting unit is configured to set the determination value to each of the programs based on the estimated time thereof, the estimated time corresponding to a time when the execution of each of the programs is estimated to be completed.

14. A system according to claim 12, wherein the program is composed of a plurality of programs to be sequentially executed by the processing unit, the plurality of programs are started from an initiation task, and terminated by a termination task, and the generating unit comprises:

a starting unit configured to start the interrupt generation every predetermined period in response to execution of the initiation task; and a terminating unit configured to terminate the interrupt generation in response to execution of the termination task.

15. A system according to claim 14, further comprising:

a first executing unit configured to execute the initiation task; and a second execution unit configured to execute the termination task, the first execution unit comprising:

a first unit configured to change the watchdog signal;

a second unit configured to set the determination value based on the estimated time when the execution of the program is estimated to be completed;

a third unit configured to clear a count value representing the number of the interrupts; and a fourth unit having a timer and configured to activate the timer every predetermined period to count, and the second execution unit comprising:

a fifth unit configured to change the watchdog signal; and a sixth unit configured to stop the timer.

16. A system according to claim 12, wherein the program is composed of a plurality of programs to be sequentially executed by the processing unit, further comprising:

a changing unit configured to change the determination value based on an estimated execution time during any one of tasks being executed by the processing unit, the tasks constituting the plurality of programs, the estimated execution time being estimated as an execution time of any one of the tasks.

17. A system according to claim 12, wherein the program is composed of a plurality of programs to be sequentially executed by the processing unit, further comprising:

a changing unit configured to change the predetermined period corresponding to any one of tasks being executed by the processing unit, the tasks constituting the plurality of programs.

18. A system according to claim 17, wherein the program is composed of a plurality of programs to be sequentially executed by the processing unit, the plurality of programs are started from an initiation task, and terminated by a termination task, further comprising:

a first executing unit configured to execute the initiation task; and a second execution unit configured to execute, as the changing of the predetermined period corresponding to any one of the tasks, the first execution unit comprising;

a first unit configured to change the watchdog signal;

a second unit configured to set the predetermined period to a first period with respect to at least one of the tasks, the at least one of the tasks being executed by the processing unit until the predetermined period is changed;

a third unit configured to set the determination value to a first determination value, the first determination value being obtained by dividing a first estimated execution time by the first predetermined period, the first estimated execution time being estimated as an execution time of the at least one of the tasks;

a fourth unit configured to clear a count value representing the number of the interrupts; and a fifth unit configured to activate a timer every first predetermined period to count, the second execution unit comprising:

a sixth unit configured to change the watchdog signal;

a seventh unit configured to stop the timer, an eighth unit configured to set the predetermined period with respect to any one of the tasks to a second period;

a ninth unit configured to set the determination value to a second determination value, the second determination value being obtained by dividing a second estimated execution time by the second predetermined period, the second estimated execution time being estimated as an execution time of the at least one of the tasks;

a tenth unit configured to clear a count value representing the number of the interrupts; and an eleventh unit configured to activate the timer every second predetermined period to count.

19. A system according to claim 11, wherein the generating unit includes a free run counter and is configured to generate an interrupt to the processing unit every predetermined period using the free run counter and at least one of:

overflow interrupt based on overflow of the free run counter;

a compare register and compare match interrupt based on a count value of the free run counter and a setting value stored in the compare register; and a periodic register and pulse width modulation periodic interrupt executed every time the count value of the free run counter reaches a pulse width modulation period set to the periodic register upon execution of duty control by the free run counter.

20. A system according to claim 11, wherein the program includes at least one of:

an initialization program to be executed at power-up of the processing unit; and an off-task program that causes the processing unit to execute various tasks required at power-off of the processing unit.

* * * * *